(12) United States Patent
Zhu et al.

(10) Patent No.: US 11,579,404 B2
(45) Date of Patent: Feb. 14, 2023

(54) OPTICAL IMAGING LENS

(71) Applicant: GENIUS ELECTRONIC OPTICAL (XIAMEN) CO., LTD., Fujian (CN)

(72) Inventors: Qingzhi Zhu, Fujian (CN); Jiali Lian, Fujian (CN); Chuanbo Dong, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 389 days.

(21) Appl. No.: 16/984,160

(22) Filed: Aug. 4, 2020

(65) Prior Publication Data
US 2021/0382266 A1  Dec. 9, 2021

(30) Foreign Application Priority Data
Jun. 5, 2020  (CN) .......................... 202010504458.6

(51) Int. Cl.
| | | |
|---|---|---|
| G02B 9/62 | (2006.01) |
| G02B 13/18 | (2006.01) |
| G02B 27/00 | (2006.01) |
| G02B 3/04 | (2006.01) |
| G02B 5/00 | (2006.01) |
| G02B 13/00 | (2006.01) |
| G02B 13/04 | (2006.01) |
| G02B 3/02 | (2006.01) |

(52) U.S. Cl.
CPC .............. *G02B 9/62* (2013.01); *G02B 13/18* (2013.01); *G02B 27/0081* (2013.01); *G02B 3/02* (2013.01); *G02B 3/04* (2013.01); *G02B 5/005* (2013.01); *G02B 13/0045* (2013.01); *G02B 13/04* (2013.01); *G02B 27/0025* (2013.01)

(58) Field of Classification Search
CPC ...... G02B 9/62; G02B 13/18; G02B 13/0045; G02B 13/04; G02B 3/04; G02B 3/02; G02B 27/0025; G02B 27/0081; G02B 5/005
USPC .................... 359/713, 740, 752, 756, 761
See application file for complete search history.

(56) References Cited

U.S. PATENT DOCUMENTS

| | | | |
|---|---|---|---|
| 10,495,850 B2* | 12/2019 | Wu | G02B 13/0045 |
| 11,226,472 B2* | 1/2022 | Lin | G02B 9/62 |
| 2015/0177485 A1* | 6/2015 | Hsu | G02B 9/62 359/761 |
| 2016/0124187 A1* | 5/2016 | Chen | G02B 13/0045 359/713 |
| 2018/0299647 A1* | 10/2018 | Wu | G02B 13/0045 |
| 2019/0250379 A1* | 8/2019 | Kim | H04N 5/374 |
| 2020/0103630 A1* | 4/2020 | Wu | G02B 9/62 |
| 2020/0393655 A1* | 12/2020 | Liao | G02B 9/62 |
| 2021/0072510 A1* | 3/2021 | Lu | G02B 9/62 |
| 2021/0333520 A1* | 10/2021 | Wu | G02B 9/62 |
| 2022/0091377 A1* | 3/2022 | Dong | G02B 13/0045 |
| 2022/0308315 A1* | 9/2022 | Jhang | G02B 9/64 |

* cited by examiner

*Primary Examiner* — Evelyn A Lester
(74) *Attorney, Agent, or Firm* — JCIPRNET

(57) ABSTRACT

An imaging lens includes first, second, third, fourth, fifth and six lens elements arranged in order from an object side to an image side along an optical axis. Each of the lens element has a thickness along the optical axis. Two of thicknesses of the first to the fourth lens elements along the optical axis are the thickest and the second thickest among the abovementioned six lens elements, respectively.

20 Claims, 36 Drawing Sheets

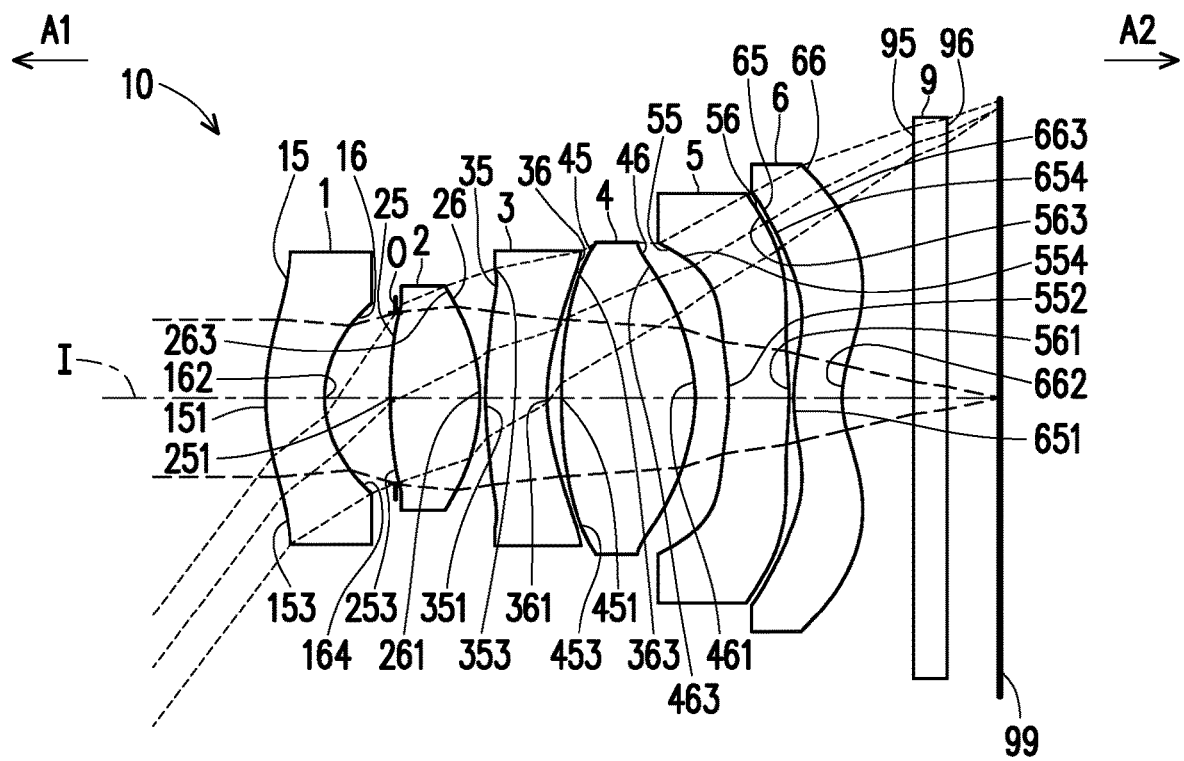
FIG. 6
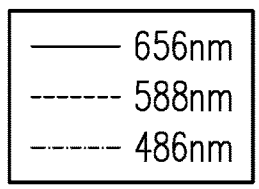
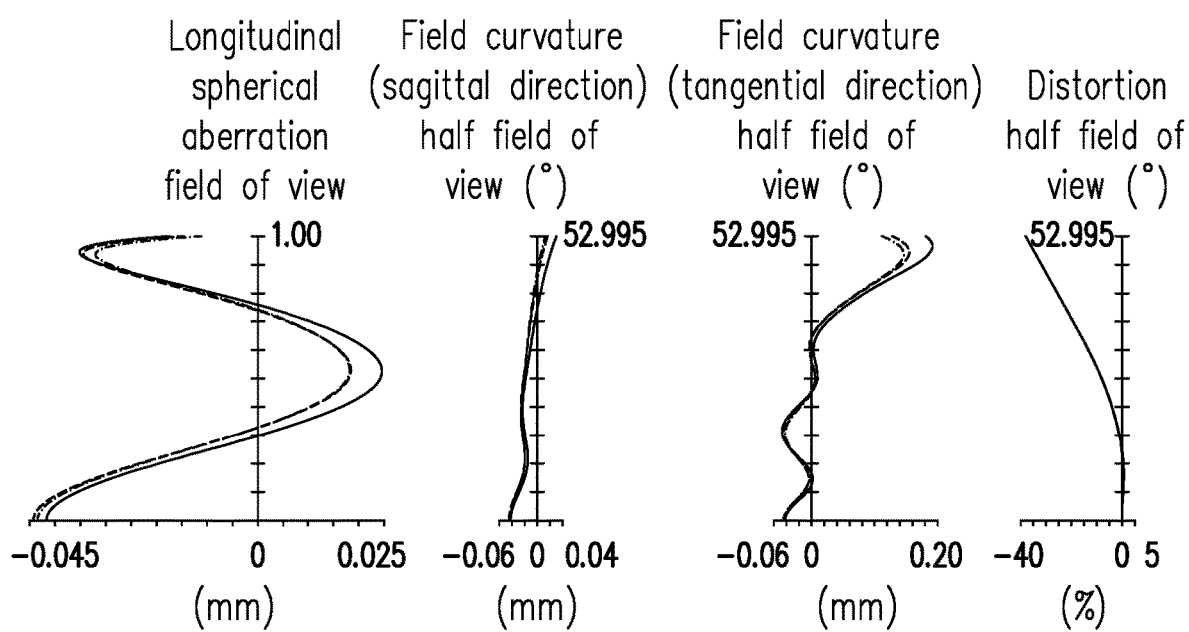
FIG. 7A  FIG. 7B  FIG. 7C  FIG. 7D

| First Embodiment |||||||
|---|---|---|---|---|---|---|
| Effective focal length(EFL)= 2.161 mm , half field of view(HFOV)= 52.995°, system length= 4.576 mm ,F-number(Fno)= 2.200, Image height(ImgH)= 1.810 mm |||||||
| Lens Element | Surface | Radius (mm) | Thickness (mm) | Refractive Index (Nd) | Dispersion Coefficient (Vd) | Focal length (mm) |
| Object | | Infinity | Infinity | | | |
| First lens element 1 | Object-side surface 15 | 1.404 | 0.370 | 1.545 | 55.987 | -2.693 |
| | Image-side surface 16 | 0.650 | 0.443 | | | |
| Aperture 0 | | Infinity | -0.035 | | | |
| Second lens element 2 | Object-side surface 25 | 2.863 | 0.557 | 1.545 | 55.987 | 1.614 |
| | Image-side surface 26 | -1.178 | 0.037 | | | |
| Third lens element 3 | Object-side surface 35 | 2.259 | 0.382 | 1.661 | 20.373 | -4.093 |
| | Image-side surface 36 | 1.148 | 0.090 | | | |
| Fourth lens element 4 | Object-side surface 45 | 3.573 | 0.835 | 1.545 | 55.987 | 1.509 |
| | Image-side surface 46 | -0.977 | 0.208 | | | |
| Fifth lens element 5 | Object-side surface 55 | -1.125 | 0.375 | 1.661 | 20.373 | -6.156 |
| | Image-side surface 56 | -1.763 | 0.031 | | | |
| Sixth lens element 6 | Object-side surface 65 | 1.116 | 0.299 | 1.545 | 55.987 | -3.225 |
| | Image-side surface 66 | 0.617 | 0.449 | | | |
| Filter 9 | Object-side surface 95 | Infinity | 0.210 | 1.517 | 64.167 | |
| | Image-side surface 96 | Infinity | 0.326 | | | |
| | Image Plane 99 | Infinity | | | | |

FIG. 8

| Surface | K | $a_4$ | $a_6$ | $a_8$ | $a_{10}$ |
|---|---|---|---|---|---|
| 15 | 0.000000E+00 | -1.649901E-01 | -2.963493E-01 | 4.091579E-01 | -7.600251E-01 |
| 16 | 0.000000E+00 | -3.211739E-01 | 9.712173E-02 | -1.019805E+01 | 4.824874E+01 |
| 25 | -2.300182E+00 | 1.090117E-01 | -3.597508E-01 | 2.191009E+00 | -9.589462E+00 |
| 26 | -6.034217E-01 | -2.502581E-02 | 2.646295E-01 | -7.340037E-01 | -2.682805E+00 |
| 35 | 5.807799E+00 | -5.990429E-01 | 2.067956E+00 | -7.632262E+00 | 1.727424E+01 |
| 36 | 3.505269E-01 | -6.614095E-01 | 1.204087E+00 | -2.205488E+00 | 1.173403E+00 |
| 45 | -6.251136E+01 | 2.887418E-01 | -4.391362E-01 | 8.451071E-01 | -1.770434E+00 |
| 46 | -9.173199E-01 | 7.414772E-01 | -1.891038E+00 | 1.590094E+00 | 1.492262E+00 |
| 55 | -9.062513E+00 | 1.340164E+00 | -4.365991E+00 | 5.690170E+00 | -4.374933E+00 |
| 56 | -2.736715E+01 | 1.169282E+00 | -3.515759E+00 | 4.904734E+00 | -3.904825E+00 |
| 65 | -8.931809E-01 | -1.051975E+00 | -1.528240E-01 | 2.311426E+00 | -2.945102E+00 |
| 66 | -4.422607E+00 | -7.170393E-01 | 7.482277E-01 | -5.343256E-01 | 2.385246E-01 |
| Surface | $a_{12}$ | $a_{14}$ | $a_{16}$ | | |
| 15 | 1.567700E+00 | -1.623675E+00 | 6.049625E-01 | | |
| 16 | -1.666505E+02 | 4.054192E+02 | -4.904455E+02 | | |
| 25 | 2.116490E+01 | 2.885052E+00 | -4.780829E+01 | | |
| 26 | 1.564205E+01 | -2.592397E+01 | 1.628859E+01 | | |
| 35 | -2.347689E+01 | 1.668998E+01 | -4.972275E+00 | | |
| 36 | 2.415839E+00 | -4.045909E+00 | 1.560837E+00 | | |
| 45 | 2.869630E+00 | -2.410049E+00 | 7.735075E-01 | | |
| 46 | -3.955828E+00 | 2.684186E+00 | -4.923078E-01 | | |
| 55 | 1.729387E+00 | -6.126821E-01 | 3.462882E-01 | | |
| 56 | 1.719245E+00 | -3.577629E-01 | 2.089051E-02 | | |
| 65 | 1.712767E+00 | -4.772666E-01 | 4.985122E-02 | | |
| 66 | -6.232090E-02 | 8.406881E-03 | -4.117480E-04 | | |

FIG. 9

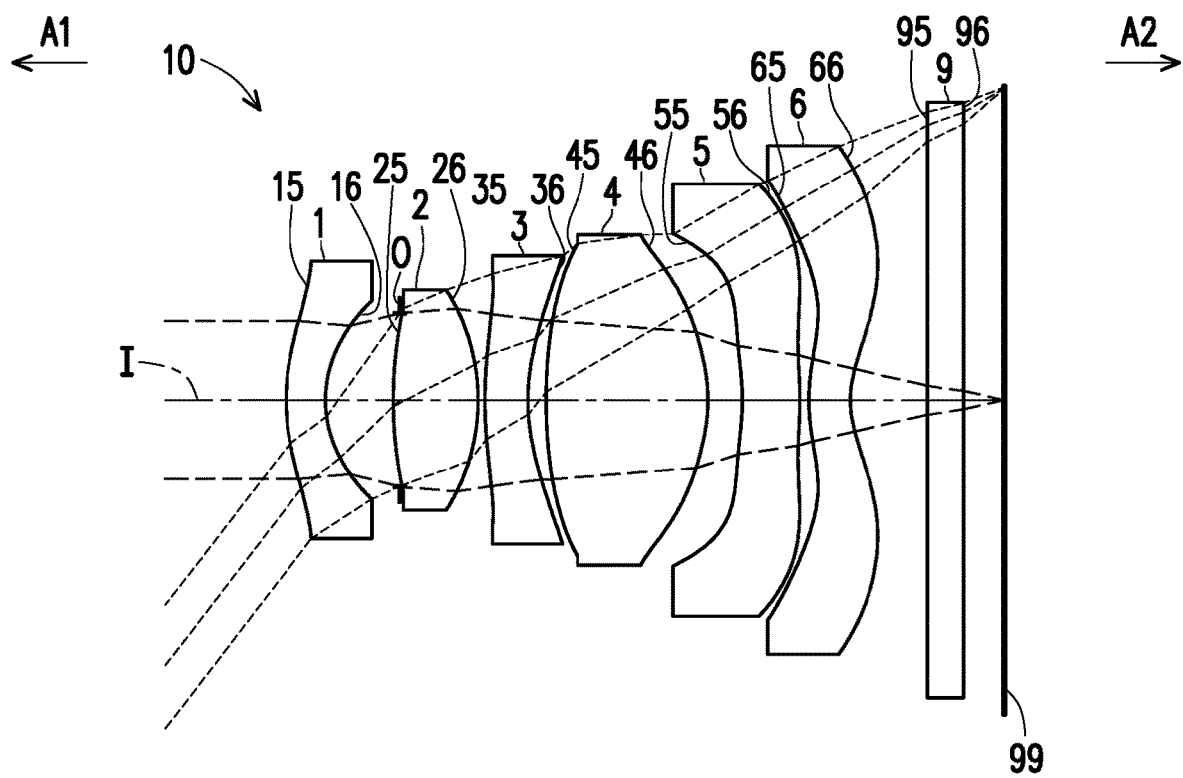
FIG. 10
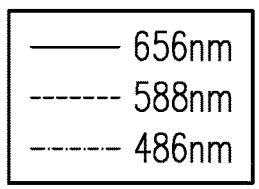
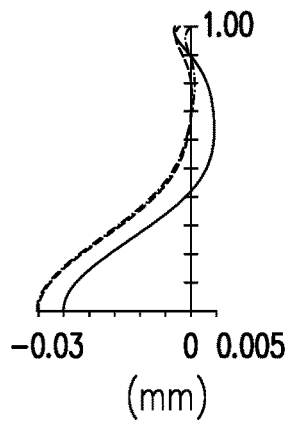
FIG. 11A
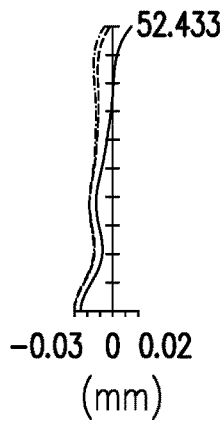
FIG. 11B
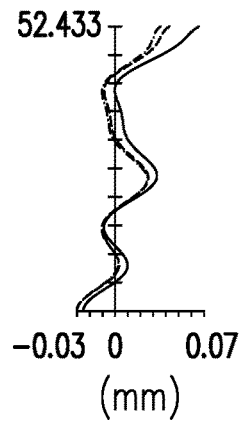
FIG. 11C
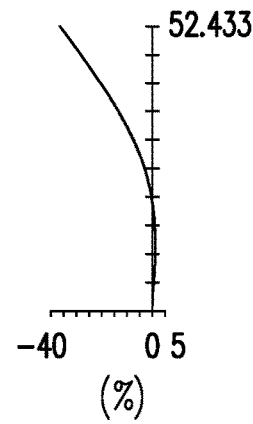
FIG. 11D

| Second Embodiment ||||||
|---|---|---|---|---|---|---|
| Effective focal length(EFL)= 2.017 mm, half field of view(HFOV)= 52.433°, system length= 4.165 mm, F-number(Fno)= 2.200, Image height(ImgH)= 1.810 mm ||||||
| Lens Element | Surface | Radius (mm) | Thickness (mm) | Refractive Index (Nd) | Dispersion Coefficient (Vd) | Focal length(mm) |
| Object | | Infinity | Infinity | | | |
| First lens element 1 | Object-side surface 15 | 1.267 | 0.230 | 1.545 | 55.987 | -3.002 |
| | Image-side surface 16 | 0.668 | 0.430 | | | |
| Aperture 0 | | Infinity | -0.037 | | | |
| Second lens element 2 | Object-side surface 25 | 2.660 | 0.490 | 1.545 | 55.987 | 1.592 |
| | Image-side surface 26 | -1.199 | 0.039 | | | |
| Third lens element 3 | Object-side surface 35 | 2.225 | 0.250 | 1.661 | 20.373 | -3.888 |
| | Image-side surface 36 | 1.138 | 0.106 | | | |
| Fourth lens element 4 | Object-side surface 45 | 3.299 | 0.939 | 1.545 | 55.987 | 1.501 |
| | Image-side surface 46 | -0.975 | 0.198 | | | |
| Fifth lens element 5 | Object-side surface 55 | -1.328 | 0.334 | 1.661 | 20.373 | -6.197 |
| | Image-side surface 56 | -2.163 | 0.052 | | | |
| Sixth lens element 6 | Object-side surface 65 | 1.091 | 0.240 | 1.545 | 55.987 | -3.030 |
| | Image-side surface 66 | 0.606 | 0.449 | | | |
| Filter 9 | Object-side surface 95 | Infinity | 0.210 | 1.517 | 64.167 | |
| | Image-side surface 96 | Infinity | 0.236 | | | |
| | Image Plane 99 | Infinity | | | | |

FIG. 12

| Surface | K | $a_4$ | $a_6$ | $a_8$ | $a_{10}$ |
|---|---|---|---|---|---|
| 15 | 0.000000E+00 | -2.195620E-01 | -3.337410E-01 | 3.885720E-01 | -7.674738E-01 |
| 16 | 0.000000E+00 | -2.969711E-01 | 1.173380E-01 | -8.322634E+00 | 4.712568E+01 |
| 25 | -3.277673E+00 | 1.043104E-01 | -3.436399E-01 | 2.254513E+00 | -9.913540E+00 |
| 26 | -6.567229E-01 | -1.589974E-02 | 2.317928E-01 | -8.901483E-01 | -3.145281E+00 |
| 35 | 5.615443E+00 | -6.090106E-01 | 2.056273E+00 | -7.725896E+00 | 1.709871E+01 |
| 36 | 3.818747E-01 | -6.601023E-01 | 1.210862E+00 | -2.187395E+00 | 1.148650E+00 |
| 45 | -5.009048E+01 | 2.789468E-01 | -4.394372E-01 | 8.446866E-01 | -1.764075E+00 |
| 46 | -8.501292E-01 | 7.182969E-01 | -1.890002E+00 | 1.585377E+00 | 1.486715E+00 |
| 55 | -1.073825E+01 | 1.343223E+00 | -4.369987E+00 | 5.699931E+00 | -4.374619E+00 |
| 56 | -3.907920E+01 | 1.207256E+00 | -3.530274E+00 | 4.894608E+00 | -3.904002E+00 |
| 65 | -9.083567E-01 | -1.056360E+00 | -1.490062E-01 | 2.312090E+00 | -2.945424E+00 |
| 66 | -3.607812E+00 | -6.909212E-01 | 7.557483E-01 | -5.364169E-01 | 2.379997E-01 |
| Surface | $a_{12}$ | $a_{14}$ | $a_{16}$ | | |
| 15 | 1.640906E+00 | -1.464376E+00 | 3.312789E-01 | | |
| 16 | -1.821314E+02 | 4.035962E+02 | -3.860775E+02 | | |
| 25 | 2.002608E+01 | -2.167587E+00 | -2.516564E+01 | | |
| 26 | 1.567064E+01 | -2.434219E+01 | 1.718014E+01 | | |
| 35 | -2.335729E+01 | 1.698759E+01 | -5.223246E+00 | | |
| 36 | 2.293458E+00 | -4.097701E+00 | 1.699956E+00 | | |
| 45 | 2.873815E+00 | -2.417946E+00 | 7.739380E-01 | | |
| 46 | -3.961459E+00 | 2.687179E+00 | -4.811222E-01 | | |
| 55 | 1.723760E+00 | -6.171724E-01 | 3.417116E-01 | | |
| 56 | 1.719357E+00 | -3.578427E-01 | 2.084601E-02 | | |
| 65 | 1.712553E+00 | -4.773265E-01 | 4.982548E-02 | | |
| 66 | -6.237223E-02 | 8.440836E-03 | -4.101424E-04 | | |

FIG. 13

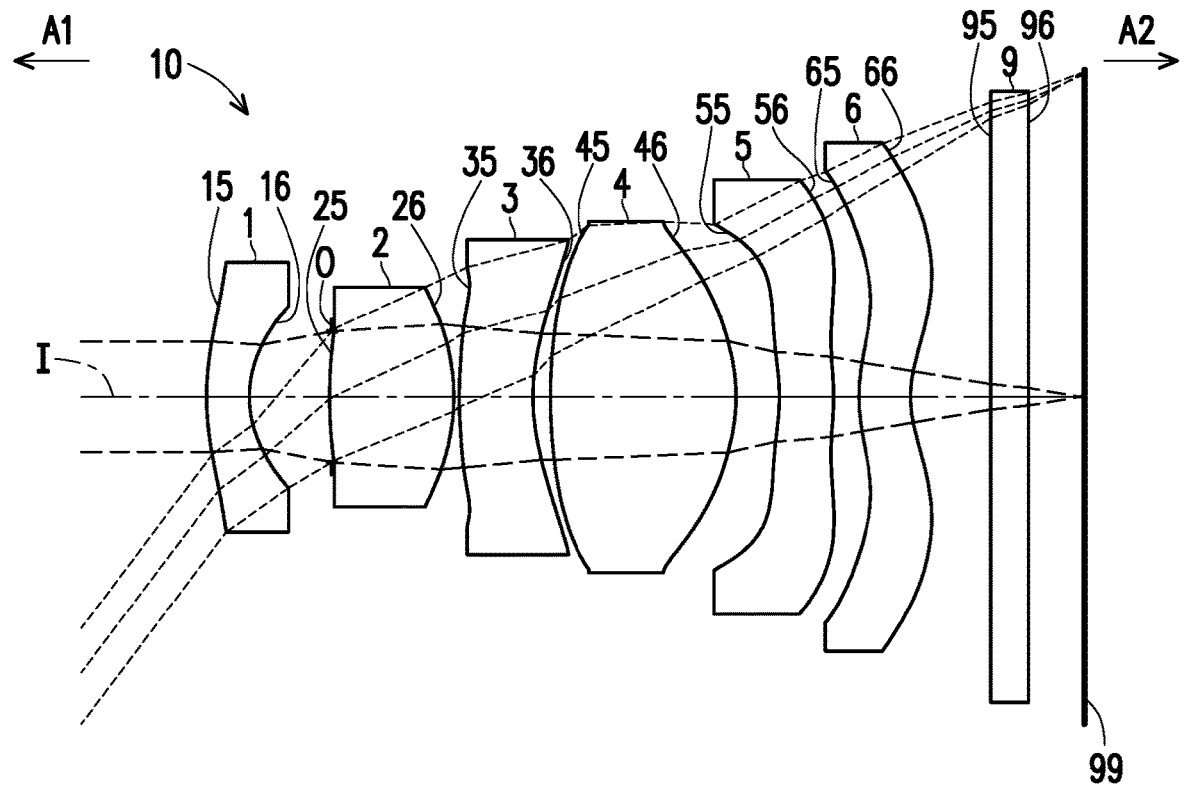
FIG. 14
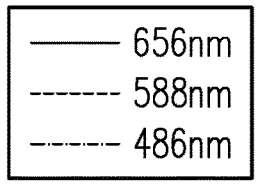
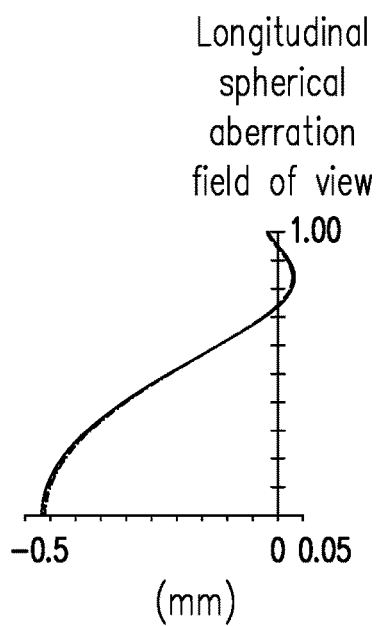
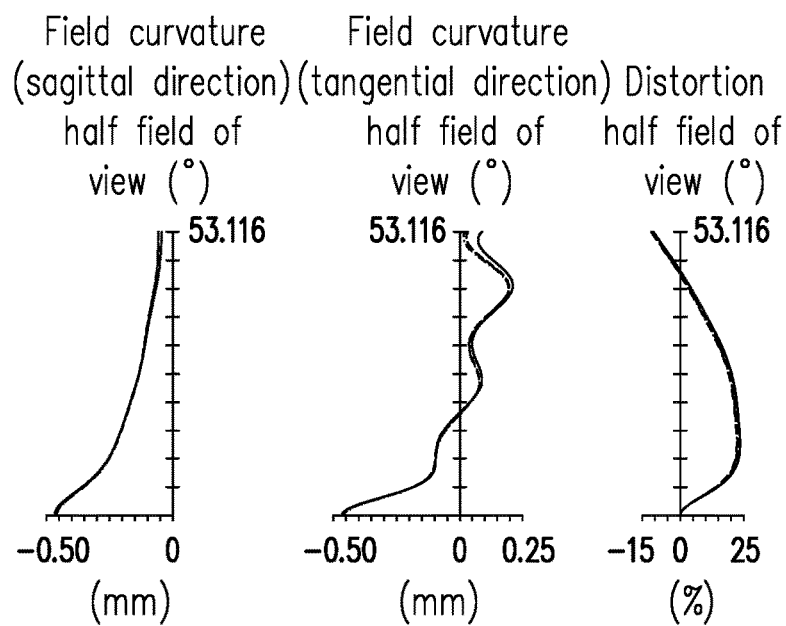
FIG. 15A   FIG. 15B   FIG. 15C   FIG. 15D

| Third Embodiment ||||||
|---|---|---|---|---|---|
| Effective focal length(EFL)= 1.360 mm, half field of view(HFOV)= 53.116°, system length= 4.916 mm, F-number(Fno)= 2.200, Image height(ImgH)= 1.810 mm ||||||
| Lens Element | Surface | Radius (mm) | Thickness (mm) | Refractive Index (Nd) | Dispersion Coefficient (Vd) | Focal length(mm) |
| Object | | Infinity | Infinity | | | |
| First lens element 1 | Object-side surface 15 | 1.573 | 0.239 | 1.545 | 55.987 | -2.102 |
| | Image-side surface 16 | 0.626 | 0.464 | | | |
| Aperture 0 | | Infinity | -0.012 | | | |
| Second lens element 2 | Object-side surface 25 | 2.772 | 0.694 | 1.545 | 55.987 | 1.618 |
| | Image-side surface 26 | -1.174 | 0.030 | | | |
| Third lens element 3 | Object-side surface 35 | 2.267 | 0.412 | 1.661 | 20.373 | -4.172 |
| | Image-side surface 36 | 1.153 | 0.097 | | | |
| Fourth lens element 4 | Object-side surface 45 | 2.771 | 1.041 | 1.545 | 55.987 | 1.465 |
| | Image-side surface 46 | -0.969 | 0.242 | | | |
| Fifth lens element 5 | Object-side surface 55 | -1.115 | 0.304 | 1.661 | 20.373 | 44.197 |
| | Image-side surface 56 | -1.190 | 0.142 | | | |
| Sixth lens element 6 | Object-side surface 65 | 0.980 | 0.291 | 1.545 | 55.987 | -4.785 |
| | Image-side surface 66 | 0.637 | 0.449 | | | |
| Filter 9 | Object-side surface 95 | Infinity | 0.210 | 1.517 | 64.167 | |
| | Image-side surface 96 | Infinity | 0.313 | | | |
| | Image Plane 99 | Infinity | | | | |

FIG. 16

| Surface | K | $a_4$ | $a_6$ | $a_8$ | $a_{10}$ |
|---|---|---|---|---|---|
| 15 | 0.000000E+00 | -2.095351E-01 | -2.983513E-01 | 4.359524E-01 | -6.805974E-01 |
| 16 | 0.000000E+00 | 5.033348E-04 | -1.518498E+00 | -1.575513E+01 | 5.260892E+01 |
| 25 | -1.326235E+01 | 3.809851E-02 | -4.150058E-01 | 3.620503E+00 | 1.139341E+01 |
| 26 | -9.399601E-01 | 5.037154E-03 | 1.954535E-01 | -1.718903E+00 | -4.065068E+00 |
| 35 | 5.183844E+00 | -6.209591E-01 | 2.069093E+00 | -7.678595E+00 | 1.701328E+01 |
| 36 | 3.761114E-01 | -6.612262E-01 | 1.202364E+00 | -2.215527E+00 | 1.145977E+00 |
| 45 | -8.121268E+01 | 2.785127E-01 | -4.384093E-01 | 8.470591E-01 | -1.749752E+00 |
| 46 | -8.261368E-01 | 7.163725E-01 | -1.886712E+00 | 1.598351E+00 | 1.488128E+00 |
| 55 | -1.489252E+01 | 1.381741E+00 | -4.362751E+00 | 5.701994E+00 | -4.376329E+00 |
| 56 | -8.699165E+01 | 1.197922E+00 | -3.531331E+00 | 4.895417E+00 | -3.903720E+00 |
| 65 | -9.317203E-01 | -1.058965E+00 | -1.519441E-01 | 2.310691E+00 | -2.945879E+00 |
| 66 | -5.249028E+00 | -6.938632E-01 | 7.558231E-01 | -5.362032E-01 | 2.380931E-01 |
| Surface | $a_{12}$ | $a_{14}$ | $a_{16}$ | | |
| 15 | 1.901643E+00 | -1.091028E+00 | -8.198063E-01 | | |
| 16 | -4.857406E+01 | 6.441561E+02 | -1.962925E+03 | | |
| 25 | 1.538302E+02 | -3.300948E+02 | -5.109542E+03 | | |
| 26 | 2.966288E+01 | -5.986829E+00 | -5.521955E+01 | | |
| 35 | -2.290244E+01 | 1.748346E+01 | -6.056721E+00 | | |
| 36 | 2.378693E+00 | -3.989195E+00 | 1.569119E+00 | | |
| 45 | 2.875984E+00 | -2.433658E+00 | 7.816449E-01 | | |
| 46 | -3.964335E+00 | 2.677157E+00 | -4.963527E-01 | | |
| 55 | 1.721277E+00 | -6.193777E-01 | 3.399202E-01 | | |
| 56 | 1.719433E+00 | -3.578708E-01 | 2.086591E-02 | | |
| 65 | 1.712406E+00 | -4.773887E-01 | 4.979022E-02 | | |
| 66 | -6.233401E-02 | 8.449827E-03 | -4.088346E-04 | | |

FIG. 17

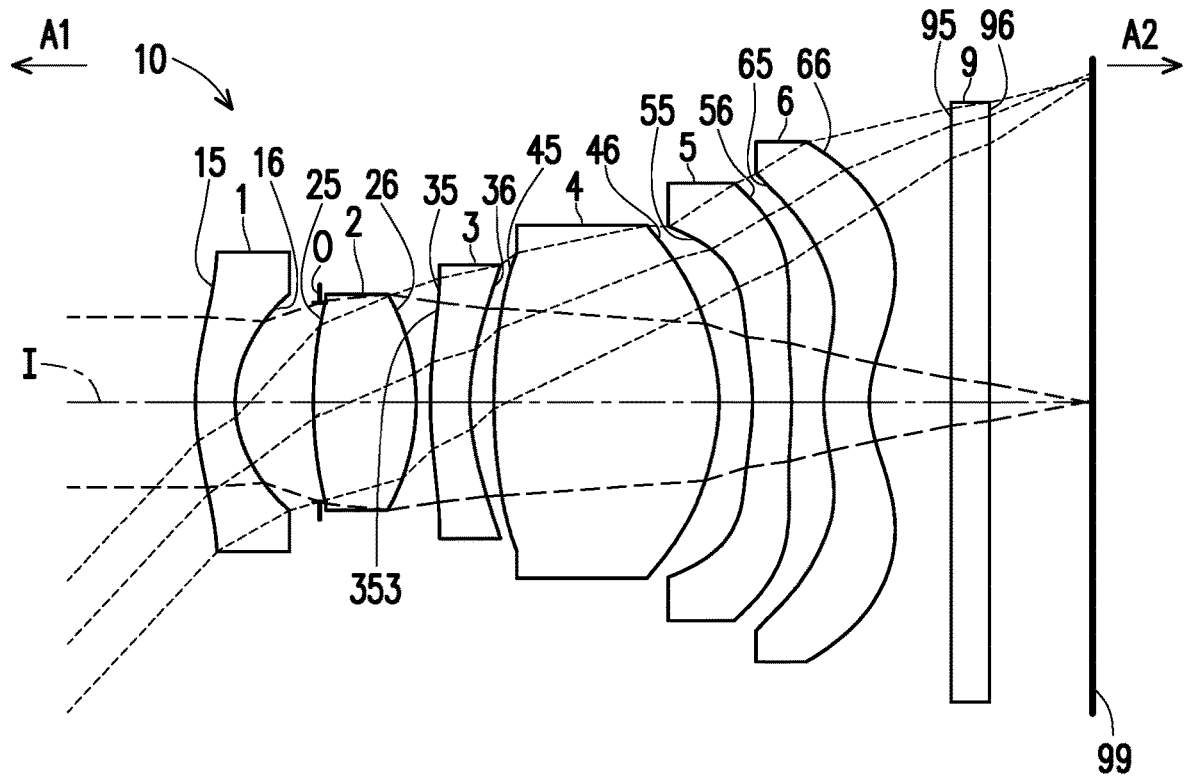
FIG. 18
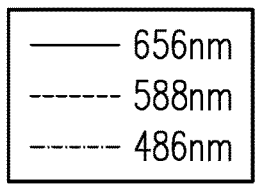
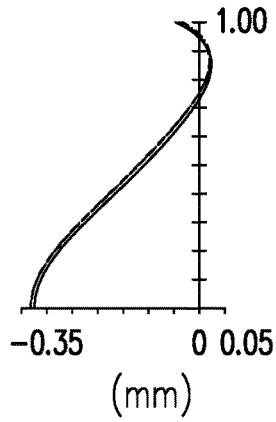
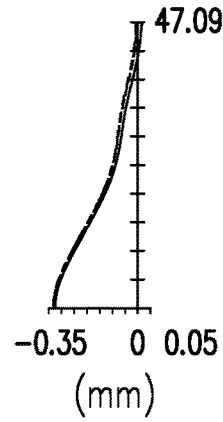
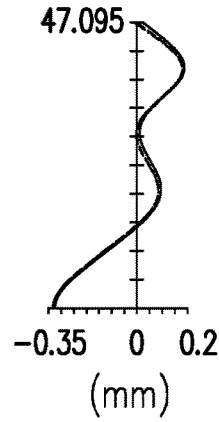
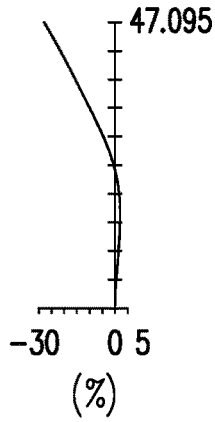
FIG. 19A  FIG. 19B  FIG. 19C  FIG. 19D

| Fourth Embodiment | | | | | | |
|---|---|---|---|---|---|---|
| Effective focal length(EFL)= 2.050 mm , half field of view(HFOV)= 47.095°, system length= 4.926 mm ,F-number(Fno)= 2.200, Image height(ImgH)= 1.810 mm | | | | | | |
| Lens Element | Surface | Radius (mm) | Thickness (mm) | Refractive Index (Nd) | Dispersion Coefficient (Vd) | Focal length(mm) |
| Object | | Infinity | Infinity | | | |
| First lens element 1 | Object-side surface 15 | 1.473 | 0.217 | 1.545 | 55.987 | -2.357 |
| | Image-side surface 16 | 0.650 | 0.464 | | | |
| Aperture 0 | | Infinity | -0.035 | | | |
| Second lens element 2 | Object-side surface 25 | 2.474 | 0.567 | 1.545 | 55.987 | 1.552 |
| | Image-side surface 26 | -1.177 | 0.078 | | | |
| Third lens element 3 | Object-side surface 35 | 2.221 | 0.216 | 1.661 | 20.373 | -3.884 |
| | Image-side surface 36 | 1.144 | 0.132 | | | |
| Fourth lens element 4 | Object-side surface 45 | 2.968 | 1.234 | 1.545 | 55.987 | 1.566 |
| | Image-side surface 46 | -1.019 | 0.184 | | | |
| Fifth lens element 5 | Object-side surface 55 | -1.173 | 0.217 | 1.661 | 20.373 | -5.128 |
| | Image-side surface 56 | -1.927 | 0.177 | | | |
| Sixth lens element 6 | Object-side surface 65 | 1.036 | 0.249 | 1.545 | 55.987 | -3.281 |
| | Image-side surface 66 | 0.600 | 0.449 | | | |
| Filter 9 | Object-side surface 95 | Infinity | 0.210 | 1.517 | 64.167 | |
| | Image-side surface 96 | Infinity | 0.566 | | | |
| | Image Plane 99 | Infinity | | | | |

FIG. 20

| Surface | K | $a_4$ | $a_6$ | $a_8$ | $a_{10}$ |
|---|---|---|---|---|---|
| 15 | 0.000000E+00 | -2.231007E-01 | -2.842399E-01 | 4.329410E-01 | -7.948469E-01 |
| 16 | 0.000000E+00 | -2.952722E-01 | 5.532380E-02 | -8.744777E+00 | 4.692888E+01 |
| 25 | -3.817699E+00 | 1.040964E-01 | -3.429468E-01 | 2.232075E+00 | -1.003333E+01 |
| 26 | -6.620406E-01 | -1.421882E-02 | 2.582956E-01 | -8.764515E-01 | -3.118487E+00 |
| 35 | 5.603929E+00 | -6.068060E-01 | 2.074308E+00 | -7.682294E+00 | 1.707989E+01 |
| 36 | 3.846862E-01 | -6.632351E-01 | 1.202741E+00 | -2.182434E+00 | 1.142071E+00 |
| 45 | -1.014177E+02 | 2.699337E-01 | -4.371541E-01 | 8.504890E-01 | -1.765788E+00 |
| 46 | -8.246733E-01 | 7.296682E-01 | -1.889058E+00 | 1.593688E+00 | 1.493360E+00 |
| 55 | -7.732339E+00 | 1.365133E+00 | -4.350825E+00 | 5.668716E+00 | -4.398838E+00 |
| 56 | -2.946504E+01 | 1.170047E+00 | -3.514970E+00 | 4.859140E+00 | -3.907270E+00 |
| 65 | -1.196294E+00 | -1.076390E+00 | -1.742621E-01 | 2.311547E+00 | -2.941204E+00 |
| 66 | -3.688756E+00 | -7.555445E-01 | 7.672091E-01 | -5.439991E-01 | 2.373437E-01 |
| Surface | $a_{12}$ | $a_{14}$ | $a_{16}$ | | |
| 15 | 1.604672E+00 | -1.448711E+00 | 4.333534E-01 | | |
| 16 | -1.825518E+02 | 3.917067E+02 | -3.679710E+02 | | |
| 25 | 1.942698E+01 | -2.832402E+00 | -1.298331E+01 | | |
| 26 | 1.547085E+01 | -2.443898E+01 | 1.766599E+01 | | |
| 35 | -2.349048E+01 | 1.687768E+01 | -5.145824E+00 | | |
| 36 | 2.285860E+00 | -4.094733E+00 | 1.733437E+00 | | |
| 45 | 2.877502E+00 | -2.413988E+00 | 7.644853E-01 | | |
| 46 | -3.962113E+00 | 2.663662E+00 | -5.286754E-01 | | |
| 55 | 1.721836E+00 | -6.349317E-01 | 3.204061E-01 | | |
| 56 | 1.727437E+00 | -3.557656E-01 | 2.088727E-02 | | |
| 65 | 1.704499E+00 | -4.743647E-01 | 5.100507E-02 | | |
| 66 | -6.186056E-02 | 8.384691E-03 | -4.343211E-04 | | |

FIG. 21

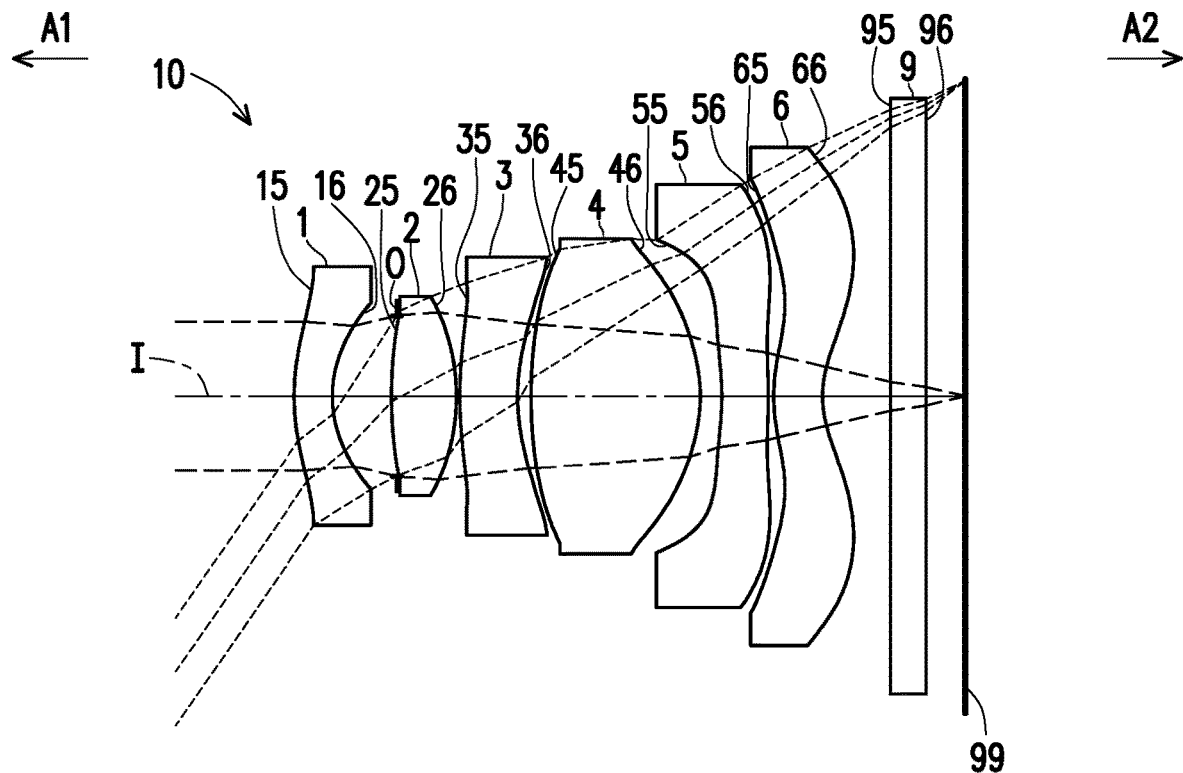
FIG. 22
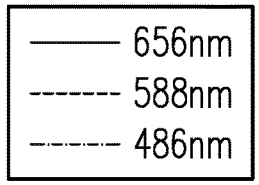
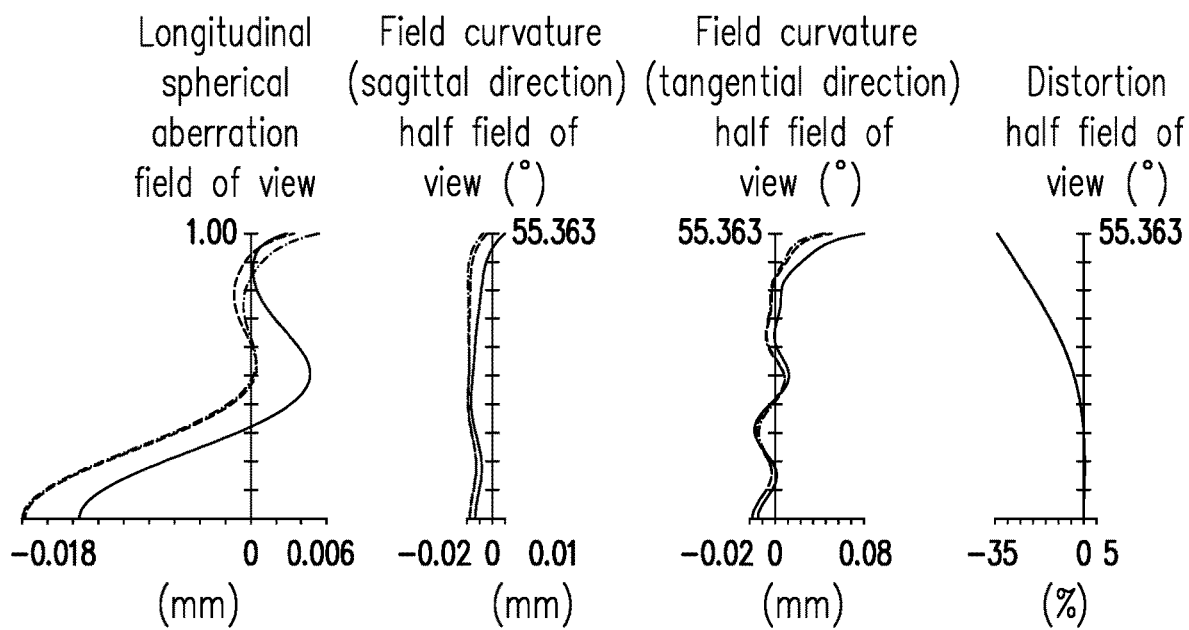
FIG. 23A   FIG. 23B   FIG. 23C   FIG. 23D

| Fifth Embodiment |||||||
|---|---|---|---|---|---|---|
| Effective focal length(EFL)= 1.937 mm , half field of view(HFOV)= 55.363°, system length= 3.963 mm ,F-number(Fno)= 2.200, Image height(ImgH)= 1.865 mm |||||||
| Lens Element | Surface | Radius (mm) | Thickness (mm) | Refractive Index (Nd) | Dispersion Coefficient (Vd) | Focal length(mm) |
| Object | | Infinity | Infinity | | | |
| First lens element 1 | Object-side surface 15 | 1.342 | 0.225 | 1.545 | 55.987 | -3.039 |
| | Image-side surface 16 | 0.697 | 0.381 | | | |
| Aperture 0 | | Infinity | -0.031 | | | |
| Second lens element 2 | Object-side surface 25 | 2.965 | 0.382 | 1.545 | 55.987 | 1.627 |
| | Image-side surface 26 | -1.203 | 0.020 | | | |
| Third lens element 3 | Object-side surface 35 | 2.356 | 0.341 | 1.661 | 20.373 | -3.935 |
| | Image-side surface 36 | 1.164 | 0.079 | | | |
| Fourth lens element 4 | Object-side surface 45 | 2.825 | 1.001 | 1.545 | 55.987 | 1.399 |
| | Image-side surface 46 | -0.910 | 0.128 | | | |
| Fifth lens element 5 | Object-side surface 55 | -1.403 | 0.274 | 1.661 | 20.373 | -4.653 |
| | Image-side surface 56 | -2.782 | 0.031 | | | |
| Sixth lens element 6 | Object-side surface 65 | 1.004 | 0.288 | 1.545 | 55.987 | -3.438 |
| | Image-side surface 66 | 0.587 | 0.405 | | | |
| Filter 9 | Object-side surface 95 | Infinity | 0.210 | 1.517 | 64.167 | |
| | Image-side surface 96 | Infinity | 0.231 | | | |
| | Image Plane 99 | Infinity | | | | |

FIG. 24

| Surface | K | $a_4$ | $a_6$ | $a_8$ | $a_{10}$ |
|---|---|---|---|---|---|
| 15 | 0.000000E+00 | -2.624337E-01 | -3.248814E-01 | 4.260536E-01 | -7.521133E-01 |
| 16 | 0.000000E+00 | -3.024097E-01 | 1.696608E-01 | -8.036196E+00 | 4.799154E+01 |
| 25 | 5.663764E-01 | 1.263109E-01 | -2.125353E-01 | 1.887691E+00 | -1.066315E+01 |
| 26 | -9.056657E-01 | 1.631237E-03 | 3.216829E-01 | -1.411011E+00 | -3.677908E+00 |
| 35 | 6.473801E+00 | -5.003695E-01 | 1.874305E+00 | -7.833463E+00 | 1.726327E+01 |
| 36 | 3.987818E-01 | -6.478441E-01 | 1.195772E+00 | -2.189938E+00 | 1.151311E+00 |
| 45 | -4.452427E+01 | 2.677030E-01 | -4.254538E-01 | 8.736656E-01 | -1.774367E+00 |
| 46 | -8.371219E-01 | 7.081063E-01 | -1.878196E+00 | 1.594846E+00 | 1.475346E+00 |
| 55 | -1.047253E+01 | 1.347100E+00 | -4.373712E+00 | 5.668327E+00 | -4.406422E+00 |
| 56 | -4.044698E+01 | 1.213465E+00 | -3.520488E+00 | 4.896836E+00 | -3.902480E+00 |
| 65 | -8.357579E-01 | -1.042168E+00 | -1.486654E-01 | 2.308935E+00 | -2.947040E+00 |
| 66 | -3.204883E+00 | -6.739454E-01 | 7.377322E-01 | -5.381879E-01 | 2.384427E-01 |
| Surface | $a_{12}$ | $a_{14}$ | $a_{16}$ | | |
| 15 | 1.621702E+00 | -1.520307E+00 | 2.448132E-01 | | |
| 16 | -1.812921E+02 | 4.035175E+02 | -4.023217E+02 | | |
| 25 | 2.200363E+01 | 7.952210E+00 | -6.817252E+01 | | |
| 26 | 1.734650E+01 | -2.045373E+01 | -8.350804E-01 | | |
| 35 | -2.317889E+01 | 1.645972E+01 | -8.542640E+00 | | |
| 36 | 2.257602E+00 | -4.161607E+00 | 1.679200E+00 | | |
| 45 | 2.845132E+00 | -2.436319E+00 | 7.750673E-01 | | |
| 46 | -3.984812E+00 | 2.681119E+00 | -4.241949E-01 | | |
| 55 | 1.692091E+00 | -6.464587E-01 | 3.151253E-01 | | |
| 56 | 1.719654E+00 | -3.582795E-01 | 2.035885E-02 | | |
| 65 | 1.712132E+00 | -4.772100E-01 | 5.006296E-02 | | |
| 66 | -6.217055E-02 | 8.491451E-03 | -3.758311E-04 | | |

FIG. 25

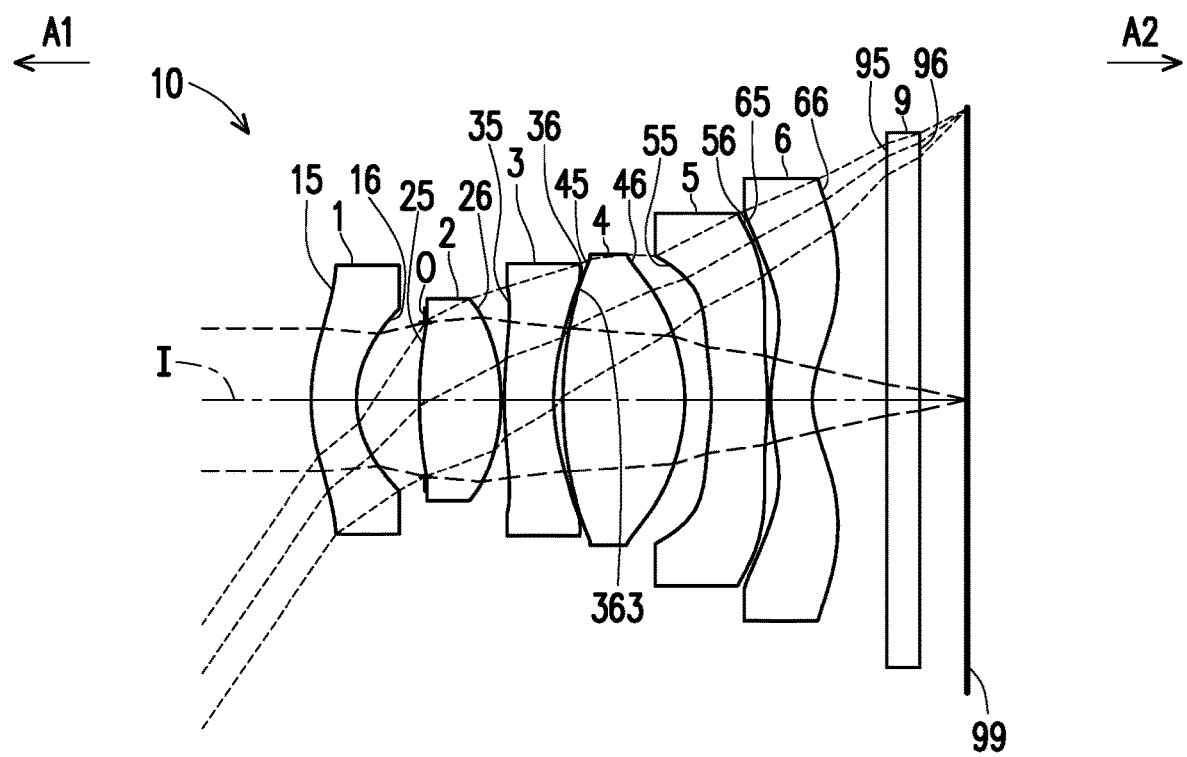
FIG. 26
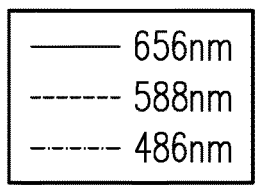
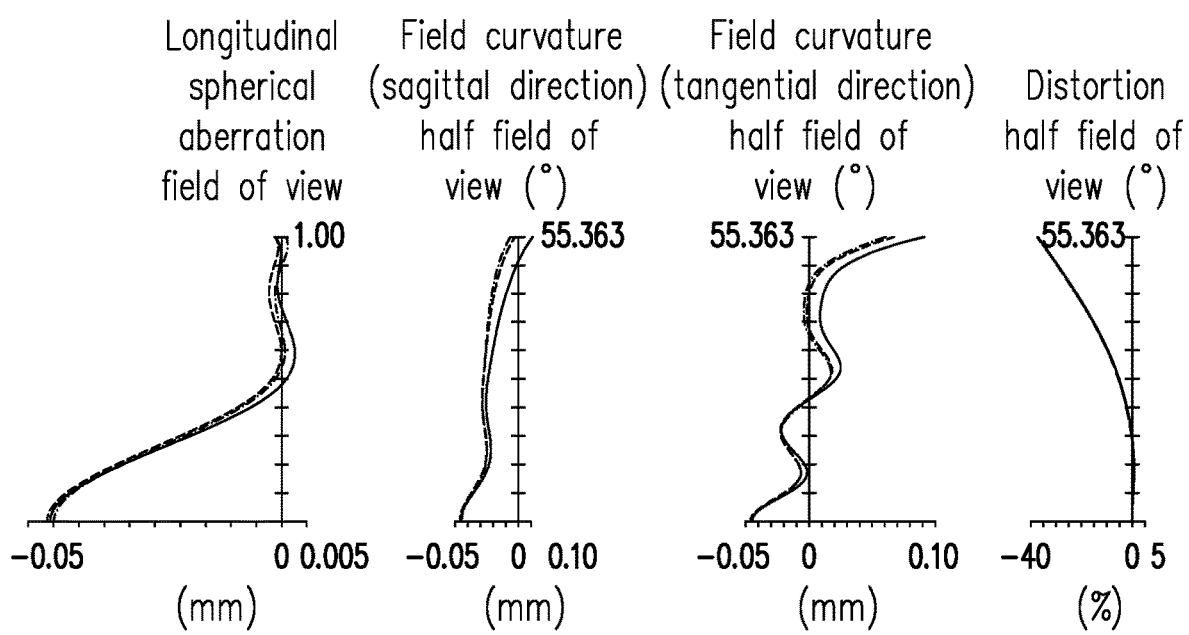
FIG. 27A  FIG. 27B  FIG. 27C  FIG. 27D

| Sixth Embodiment ||||||
|---|---|---|---|---|---|
| Effective focal length(EFL)= 2.014 mm , half field of view(HFOV)= 55.363°, system length= 4.197 mm ,F-number(Fno)= 2.200, Image height(ImgH)= 1.865 mm ||||||
| Lens Element | Surface | Radius (mm) | Thickness (mm) | Refractive Index (Nd) | Dispersion Coefficient (Vd) | Focal length(mm) |
| Object | | Infinity | Infinity | | | |
| First lens element 1 | Object-side surface 15 | 1.266 | 0.289 | 1.545 | 55.987 | -3.001 |
| | Image-side surface 16 | 0.655 | 0.440 | | | |
| Aperture 0 | | Infinity | -0.038 | | | |
| Second lens element 2 | Object-side surface 25 | 2.751 | 0.522 | 1.545 | 55.987 | 1.657 |
| | Image-side surface 26 | -1.250 | 0.021 | | | |
| Third lens element 3 | Object-side surface 35 | 2.528 | 0.314 | 1.661 | 20.373 | -3.804 |
| | Image-side surface 36 | 1.197 | 0.060 | | | |
| Fourth lens element 4 | Object-side surface 45 | 2.664 | 0.783 | 1.545 | 55.987 | 1.487 |
| | Image-side surface 46 | -1.040 | 0.168 | | | |
| Fifth lens element 5 | Object-side surface 55 | -1.314 | 0.360 | 1.640 | 23.529 | -18.527 |
| | Image-side surface 56 | -1.636 | 0.020 | | | |
| Sixth lens element 6 | Object-side surface 65 | 1.104 | 0.266 | 1.545 | 55.987 | -2.582 |
| | Image-side surface 66 | 0.565 | 0.479 | | | |
| Filter 9 | Object-side surface 95 | Infinity | 0.210 | 1.517 | 64.167 | |
| | Image-side surface 96 | Infinity | 0.304 | | | |
| | Image Plane 99 | Infinity | | | | |

FIG. 28

| Surface | K | $a_4$ | $a_6$ | $a_8$ | $a_{10}$ |
|---|---|---|---|---|---|
| 15 | 0.000000E+00 | -2.048951E-01 | -3.263717E-01 | 3.724937E-01 | -7.955888E-01 |
| 16 | 0.000000E+00 | -3.105224E-01 | -1.450253E-01 | -8.244042E+00 | 4.759670E+01 |
| 25 | -3.538211E+00 | 1.002123E-01 | -3.665709E-01 | 1.925527E+00 | -1.061152E+01 |
| 26 | -2.835155E-01 | -4.762757E-02 | 2.141623E-01 | -9.652757E-01 | -3.193333E+00 |
| 35 | 5.935883E+00 | -5.931247E-01 | 2.026623E+00 | -7.723038E+00 | 1.716308E+01 |
| 36 | 3.779040E-01 | -6.425729E-01 | 1.209883E+00 | -2.214249E+00 | 1.157488E+00 |
| 45 | -3.740405E+01 | 2.748332E-01 | -4.487294E-01 | 8.497099E-01 | -1.781185E+00 |
| 46 | -6.640487E-01 | 6.898023E-01 | -1.911455E+00 | 1.586754E+00 | 1.502536E+00 |
| 55 | -9.676751E+00 | 1.336665E+00 | -4.389632E+00 | 5.668052E+00 | -4.396794E+00 |
| 56 | -2.658529E+01 | 1.190570E+00 | -3.516518E+00 | 4.896504E+00 | -3.902910E+00 |
| 65 | -8.790383E-01 | -1.052679E+00 | -1.492576E-01 | 2.312531E+00 | -2.944781E+00 |
| 66 | -4.096736E+00 | -6.634518E-01 | 7.497477E-01 | -5.362100E-01 | 2.384431E-01 |
| Surface | $a_{12}$ | $a_{14}$ | $a_{16}$ | | |
| 15 | 1.614745E+00 | -1.455492E+00 | 4.727630E-01 | | |
| 16 | -1.860005E+02 | 3.906410E+02 | -3.609827E+02 | | |
| 25 | 1.975225E+01 | -3.462440E-01 | -3.463593E+01 | | |
| 26 | 1.566059E+01 | -2.504708E+01 | 1.006627E+01 | | |
| 35 | -2.337968E+01 | 1.677555E+01 | -5.229406E+00 | | |
| 36 | 2.341093E+00 | -4.059638E+00 | 1.627348E+00 | | |
| 45 | 2.843782E+00 | -2.434399E+00 | 8.069117E-01 | | |
| 46 | -3.939952E+00 | 2.701866E+00 | -4.727894E-01 | | |
| 55 | 1.707966E+00 | -6.094453E-01 | 4.186000E-01 | | |
| 56 | 1.719741E+00 | -3.578233E-01 | 2.108572E-02 | | |
| 65 | 1.713073E+00 | -4.769376E-01 | 5.004447E-02 | | |
| 66 | -6.230452E-02 | 8.442186E-03 | -3.684135E-04 | | |

FIG. 29

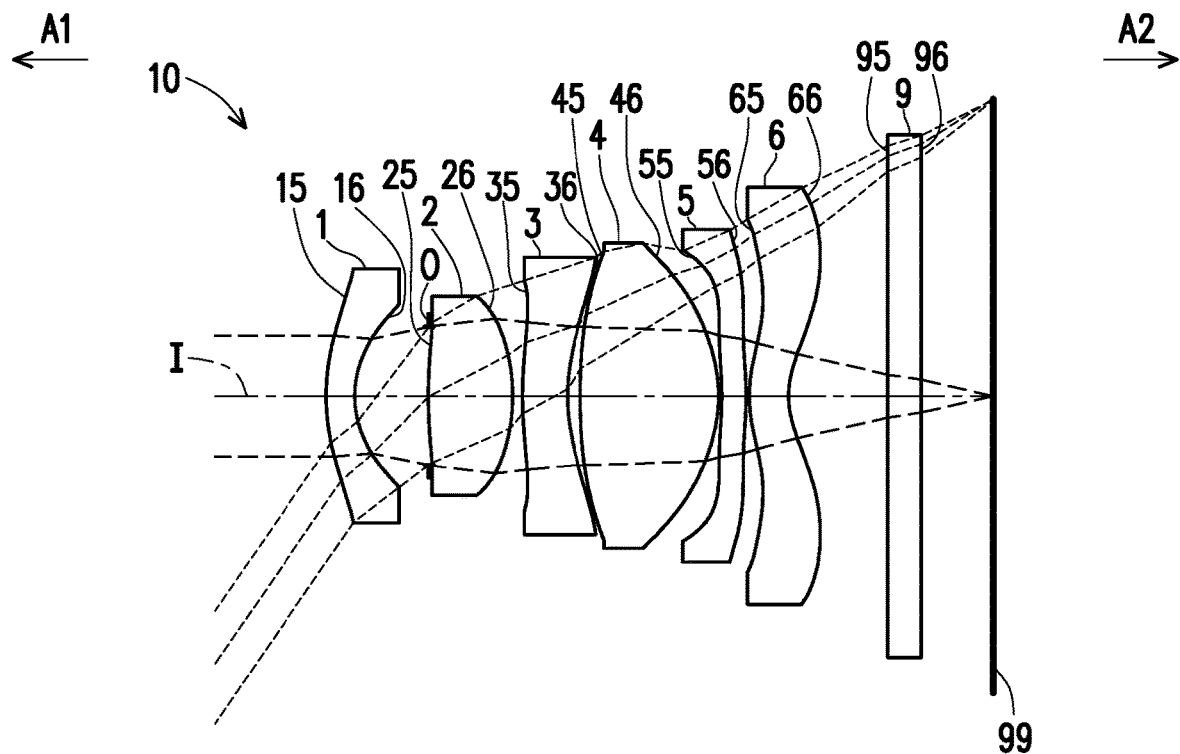
FIG. 30
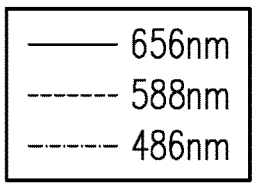
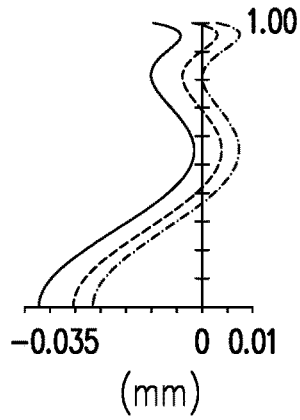
| Longitudinal spherical aberration field of view | Field curvature (sagittal direction) half field of view (°) | Field curvature (tangential direction) half field of view (°) | Distortion half field of view (°) |
FIG. 31A  FIG. 31B  FIG. 31C  FIG. 31D

| Eighth Embodiment ||||||
| --- | --- | --- | --- | --- | --- |
| Effective focal length(EFL)= 1.744 mm , half view of view(HFOV)= 55.369°, system length= 3.703 mm ,F-number(Fno)= 2.200, Image height(ImgH)= 1.865 mm ||||||
| Lens Element | Surface | Radius (mm) | Thickness (mm) | Refractive Index (Nd) | Dispersion Coefficient (Vd) | Focal length mm) |
| Object | | Infinity | Infinity | | | |
| First lens element 1 | Object-side surface 15 | 1.140 | 0.315 | 1.545 | 55.987 | -3.716 |
| | Image-side surface 16 | 0.658 | 0.460 | | | |
| Aperture 0 | | Infinity | -0.015 | | | |
| Second lens element 2 | Object-side surface 25 | 2.109 | 0.517 | 1.545 | 55.987 | 1.188 |
| | Image-side surface 26 | -0.850 | 0.017 | | | |
| Third lens element 3 | Object-side surface 35 | 2.462 | 0.218 | 1.661 | 20.373 | -4.054 |
| | Image-side surface 36 | 1.237 | 0.085 | | | |
| Fourth lens element 4 | Object-side surface 45 | 200.000 | 0.776 | 1.545 | 55.987 | -99.996 |
| | Image-side surface 46 | 42.677 | 0.094 | | | |
| Fifth lens element 5 | Object-side surface 55 | -2.081 | 0.162 | 1.661 | 20.373 | 33.195 |
| | Image-side surface 56 | -1.959 | 0.018 | | | |
| Sixth lens element 6 | Object-side surface 65 | 0.632 | 0.292 | 1.545 | 55.987 | 10.168 |
| | Image-side surface 66 | 0.597 | 0.364 | | | |
| Filter 9 | Object-side surface 95 | Infinity | 0.210 | 1.517 | 64.167 | |
| | Image-side surface 96 | Infinity | 0.191 | | | |
| | Image Plane 99 | Infinity | | | | |

FIG. 32

| Surface | K | $a_4$ | $a_6$ | $a_8$ | $a_{10}$ |
|---|---|---|---|---|---|
| 15 | 0.000000E+00 | -1.609207E-01 | -2.145494E-01 | 4.475605E-01 | -8.704858E-01 |
| 16 | 0.000000E+00 | -2.661735E-01 | -1.592554E-01 | -7.845114E+00 | 4.651546E+01 |
| 25 | -2.080376E+01 | 6.385878E-03 | -6.468149E-01 | 1.916299E+00 | -7.298319E+00 |
| 26 | -2.686480E-01 | -3.384298E-02 | -2.444120E-01 | -1.135805E+00 | -3.040910E+00 |
| 35 | 4.487549E+00 | -6.458039E-01 | 2.005515E+00 | -7.786780E+00 | 1.714855E+01 |
| 36 | 2.777160E-01 | -6.766305E-01 | 1.178260E+00 | -2.204881E+00 | 1.159875E+00 |
| 45 | -4.035478E+01 | 2.846463E-01 | -4.441336E-01 | 8.154614E-01 | -1.805159E+00 |
| 46 | -8.196645E-01 | 6.988667E-01 | -1.867318E+00 | 1.613799E+00 | 1.490320E+00 |
| 55 | -1.590147E+01 | 1.422540E+00 | -4.379005E+00 | 5.660248E+00 | -4.394539E+00 |
| 56 | -2.244964E+01 | 1.177771E+00 | -3.515694E+00 | 4.903223E+00 | -3.898242E+00 |
| 65 | -8.510996E-01 | -1.042272E+00 | -1.521173E-01 | 2.308158E+00 | -2.948630E+00 |
| 66 | -3.258756E+00 | -6.691821E-01 | 7.457012E-01 | -5.357329E-01 | 2.387254E-01 |
| Surface | $a_{12}$ | $a_{14}$ | $a_{16}$ | | |
| 15 | 1.343819E+00 | -1.745371E+00 | 9.999746E-01 | | |
| 16 | -1.901975E+02 | 3.811155E+02 | -4.591865E+02 | | |
| 25 | -2.586378E+01 | -1.309914E+02 | 7.326604E+02 | | |
| 26 | 1.505648E+01 | -2.805665E+01 | 7.390929E+00 | | |
| 35 | -2.318683E+01 | 1.711453E+01 | -5.427016E+00 | | |
| 36 | 2.336214E+00 | -4.035269E+00 | 1.707539E+00 | | |
| 45 | 2.846057E+00 | -2.410583E+00 | 8.407045E-01 | | |
| 46 | -3.984683E+00 | 2.654445E+00 | -5.039814E-01 | | |
| 55 | 1.718181E+00 | -6.158036E-01 | 3.420389E-01 | | |
| 56 | 1.722784E+00 | -3.552760E-01 | 2.259027E-02 | | |
| 65 | 1.710297E+00 | -4.789903E-01 | 4.880226E-02 | | |
| 66 | -6.255123E-02 | 8.131838E-03 | -6.337810E-04 | | |

FIG. 33

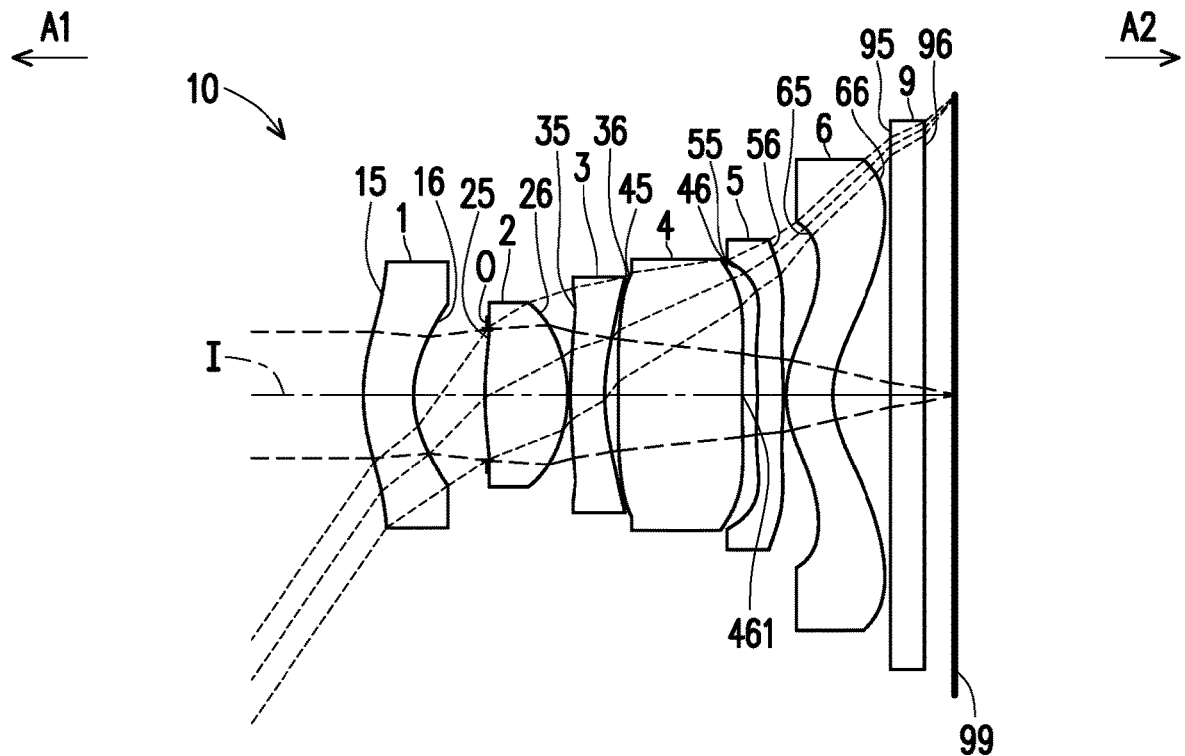
FIG. 34
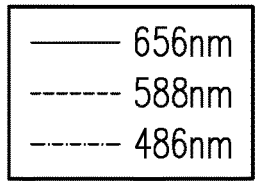
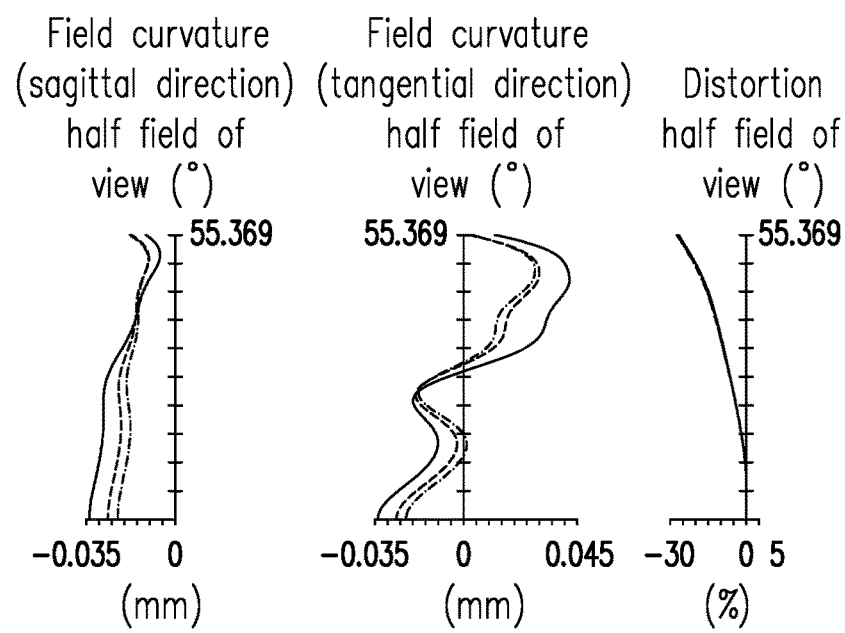
FIG. 35A   FIG. 35B   FIG. 35C   FIG. 35D

| Eighth Embodiment ||||||
|---|---|---|---|---|---|
| Effective focal length(EFL)= 1.744 mm , half field of view(HFOV)= 55.369°, system length= 3.703 mm ,F-number(Fno)= 2.200, Image height(ImgH)= 1.865 mm ||||||
| Lens Element | Surface | Radius (mm) | Thickness (mm) | Refractive Index (Nd) | Dispersion Coefficient (Vd) | Focal length(mm) |
| Object | | Infinity | Infinity | | | |
| First lens element 1 | Object-side surface 15 | 1.140 | 0.315 | 1.545 | 55.987 | -3.716 |
| | Image-side surface 16 | 0.658 | 0.460 | | | |
| Aperture 0 | | Infinity | -0.015 | | | |
| Second lens element 2 | Object-side surface 25 | 2.109 | 0.517 | 1.545 | 55.987 | 1.188 |
| | Image-side surface 26 | -0.850 | 0.017 | | | |
| Third lens element 3 | Object-side surface 35 | 2.462 | 0.218 | 1.661 | 20.373 | -4.054 |
| | Image-side surface 36 | 1.237 | 0.085 | | | |
| Fourth lens element 4 | Object-side surface 45 | 200.000 | 0.776 | 1.545 | 55.987 | -99.996 |
| | Image-side surface 46 | 42.677 | 0.094 | | | |
| Fifth lens element 5 | Object-side surface 55 | -2.081 | 0.162 | 1.661 | 20.373 | 33.195 |
| | Image-side surface 56 | -1.959 | 0.018 | | | |
| Sixth lens element 6 | Object-side surface 65 | 0.632 | 0.292 | 1.545 | 55.987 | 10.168 |
| | Image-side surface 66 | 0.597 | 0.364 | | | |
| Filter 9 | Object-side surface 95 | Infinity | 0.210 | 1.517 | 64.167 | |
| | Image-side surface 96 | Infinity | 0.191 | | | |
| | Image Plane 99 | Infinity | | | | |

FIG. 36

| Surface | K | $a_4$ | $a_6$ | $a_8$ | $a_{10}$ |
|---|---|---|---|---|---|
| 15 | 0.000000E+00 | -3.780911E-01 | -3.643575E-01 | 5.119649E-01 | -5.704732E-01 |
| 16 | 0.000000E+00 | -7.663237E-01 | -3.048774E-01 | -8.729946E+00 | 5.741117E+01 |
| 25 | -2.100613E+01 | -1.685746E-02 | -1.312262E+00 | -1.177852E-01 | -7.786485E-02 |
| 26 | -4.934093E-01 | -3.972258E-02 | 7.634143E-02 | -2.798059E+00 | -2.723526E+00 |
| 35 | 6.201897E+00 | -7.431796E-01 | 1.781984E+00 | -6.725130E+00 | 1.757252E+01 |
| 36 | 3.125015E-01 | -7.283084E-01 | 1.097609E+00 | -2.008736E+00 | 1.596154E+00 |
| 45 | 0.000000E+00 | 3.114137E-01 | -4.705308E-01 | 8.651057E-01 | -1.562176E+00 |
| 46 | 0.000000E+00 | 2.983391E-01 | -1.890502E+00 | 1.563328E+00 | 1.506470E+00 |
| 55 | -1.536183E+02 | 1.470646E+00 | -4.683044E+00 | 5.426209E+00 | -4.388826E+00 |
| 56 | -1.000000E+02 | 1.086115E+00 | -3.511976E+00 | 4.884252E+00 | -3.904022E+00 |
| 65 | -8.776249E-01 | -9.533999E-01 | -4.357905E-01 | 2.283257E+00 | -2.873644E+00 |
| 66 | -1.384860E+00 | -8.438931E-01 | 8.453085E-01 | -5.478837E-01 | 2.299016E-01 |
| Surface | $a_{12}$ | $a_{14}$ | $a_{16}$ | | |
| 15 | 1.495548E+00 | -1.825388E+00 | 6.625817E-01 | | |
| 16 | -2.394657E+02 | 5.892589E+02 | -6.295645E+02 | | |
| 25 | 1.927256E+02 | -2.160463E+03 | 5.407826E+03 | | |
| 26 | 2.527190E+01 | -3.742008E+01 | -6.024060E+01 | | |
| 35 | -2.542752E+01 | 1.685197E+01 | -2.056663E+00 | | |
| 36 | 2.537109E+00 | -4.584905E+00 | 1.465090E+00 | | |
| 45 | 3.353272E+00 | -2.553193E+00 | -8.221069E-03 | | |
| 46 | -3.910619E+00 | 2.732056E+00 | -4.707042E-01 | | |
| 55 | 1.826029E+00 | -4.974620E-01 | 4.192328E-01 | | |
| 56 | 1.734341E+00 | -3.389294E-01 | 3.752416E-02 | | |
| 65 | 1.745863E+00 | -4.950645E-01 | 2.003404E-02 | | |
| 66 | -6.234652E-02 | 9.586953E-03 | -6.683486E-04 | | |

FIG. 37

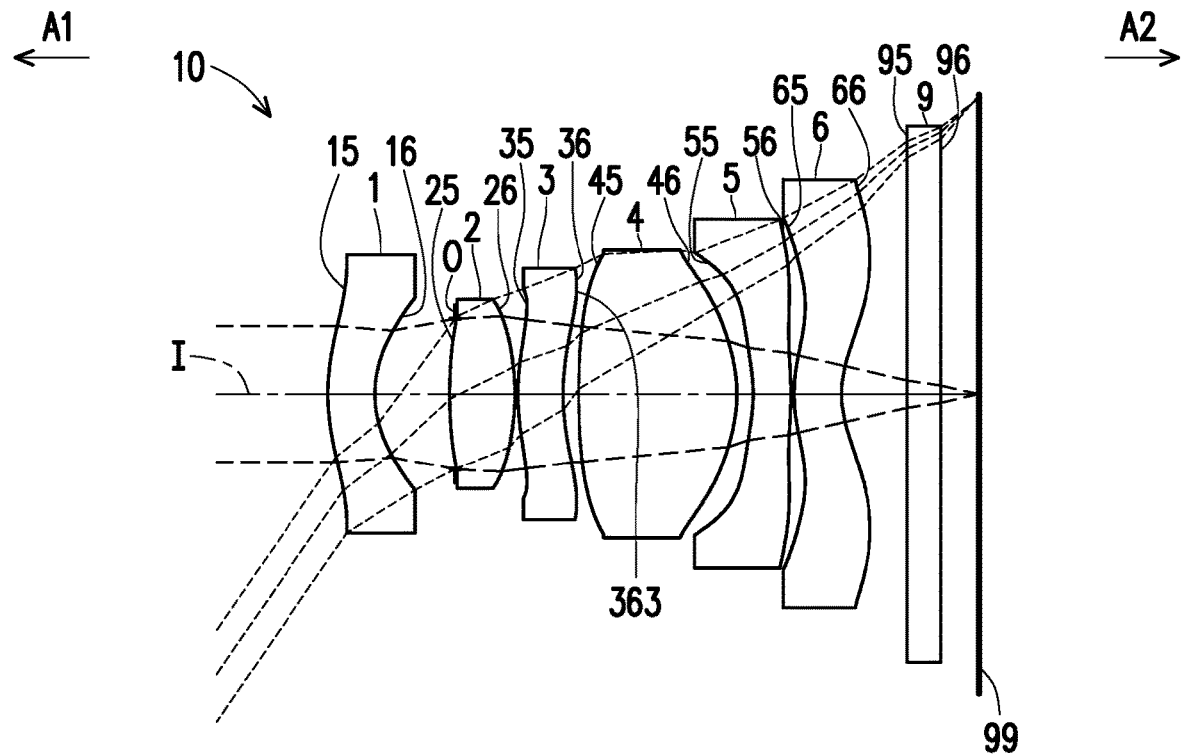
FIG. 38
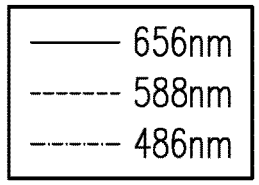
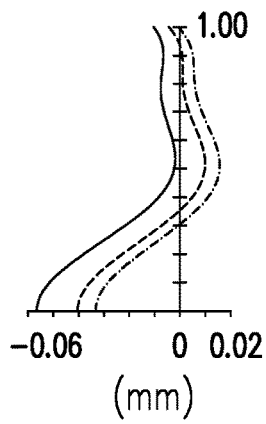
FIG. 39A
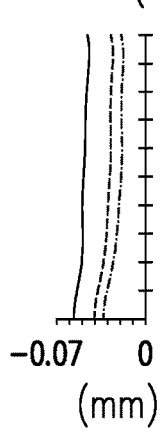
FIG. 39B
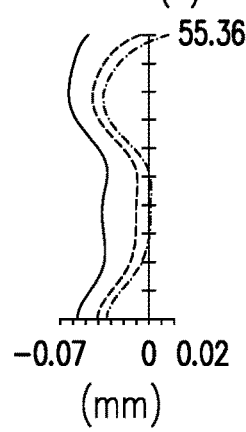
FIG. 39C
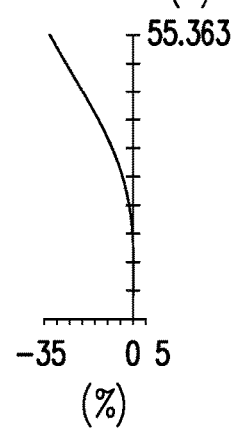
FIG. 39D

| Ninth Embodiment ||||||
|---|---|---|---|---|---|
| Effective focal length(EFL)= 1.878 mm , half field of view(HFOV)= 55.363°, system length= 4.083 mm ,F-number(Fno)= 2.200, Image height(ImgH)= 1.865 mm ||||||
| Lens Element | Surface | Radius (mm) | Thickness (mm) | Refractive Index (Nd) | Dispersion Coefficient (Vd) | Focal length(mm) |
| Object | | Infinity | Infinity | | | |
| First lens element 1 | Object-side surface 15 | 1.381 | 0.295 | 1.545 | 55.987 | -3.063 |
| | Image-side surface 16 | 0.698 | 0.501 | | | |
| Aperture 0 | | Infinity | -0.034 | | | |
| Second lens element 2 | Object-side surface 25 | 3.103 | 0.408 | 1.545 | 55.987 | 2.060 |
| | Image-side surface 26 | -1.670 | 0.020 | | | |
| Third lens element 3 | Object-side surface 35 | 1.485 | 0.282 | 1.661 | 20.373 | 90.000 |
| | Image-side surface 36 | 1.408 | 0.100 | | | |
| Fourth lens element 4 | Object-side surface 45 | 4.004 | 0.991 | 1.545 | 55.987 | 1.500 |
| | Image-side surface 46 | -0.934 | 0.102 | | | |
| Fifth lens element 5 | Object-side surface 55 | -0.978 | 0.237 | 1.661 | 20.373 | -3.021 |
| | Image-side surface 56 | -2.103 | 0.020 | | | |
| Sixth lens element 6 | Object-side surface 65 | 0.978 | 0.297 | 1.545 | 55.987 | -4.998 |
| | Image-side surface 66 | 0.643 | 0.414 | | | |
| Filter 9 | Object-side surface 95 | Infinity | 0.210 | 1.517 | 64.167 | |
| | Image-side surface 96 | Infinity | 0.241 | | | |
| | Image Plane 99 | Infinity | | | | |

FIG. 40

| Surface | K | $a_4$ | $a_6$ | $a_8$ | $a_{10}$ |
|---|---|---|---|---|---|
| 15 | 0.000000E+00 | -2.366166E-01 | -3.177929E-01 | 4.041352E-01 | -8.091609E-01 |
| 16 | 0.000000E+00 | -3.567763E-01 | -2.762698E-01 | -7.143889E+00 | 4.759172E+01 |
| 25 | 8.525571E+00 | 1.837201E-01 | -2.607232E-01 | 8.424147E-01 | -1.202987E+01 |
| 26 | 1.691520E+00 | -1.641027E-01 | 7.297780E-01 | -1.424491E+00 | -4.796925E+00 |
| 35 | 3.314417E+00 | -8.378329E-01 | 1.874770E+00 | -8.556415E+00 | 1.678466E+01 |
| 36 | 6.281663E-01 | -5.408965E-01 | 8.511056E-01 | -2.206152E+00 | 1.287840E+00 |
| 45 | -2.430191E+02 | 2.870467E-01 | -3.983404E-01 | 8.429703E-01 | -1.774719E+00 |
| 46 | -7.981039E-01 | 7.045259E-01 | -1.890401E+00 | 1.610868E+00 | 1.529275E+00 |
| 55 | -7.338243E+00 | 1.297554E+00 | -4.443687E+00 | 5.628023E+00 | -4.399645E+00 |
| 56 | -1.904983E+01 | 1.218535E+00 | -3.504920E+00 | 4.899950E+00 | -3.900949E+00 |
| 65 | -8.911372E-01 | -1.043689E+00 | -1.558411E-01 | 2.310882E+00 | -2.946044E+00 |
| 66 | -2.886012E+00 | -6.917897E-01 | 7.493989E-01 | -5.354200E-01 | 2.386833E-01 |
| Surface | $a_{12}$ | $a_{14}$ | $a_{16}$ | | |
| 15 | 1.626125E+00 | -1.421122E+00 | 4.489525E-01 | | |
| 16 | -1.933886E+02 | 3.860758E+02 | -2.999954E+02 | | |
| 25 | 2.759771E+01 | 4.163444E+01 | -1.969256E+02 | | |
| 26 | 1.633302E+01 | -1.948692E+01 | -1.140192E+01 | | |
| 35 | -2.240324E+01 | 1.640139E+01 | -1.940404E+01 | | |
| 36 | 2.424489E+00 | -4.055610E+00 | 1.582891E+00 | | |
| 45 | 2.884641E+00 | -2.399034E+00 | 7.415899E-01 | | |
| 46 | -3.934271E+00 | 2.713136E+00 | -5.010792E-01 | | |
| 55 | 1.758474E+00 | -5.417544E-01 | 5.561349E-01 | | |
| 56 | 1.721208E+00 | -3.573244E-01 | 2.040635E-02 | | |
| 65 | 1.711858E+00 | -4.781605E-01 | 4.988806E-02 | | |
| 66 | -6.223663E-02 | 8.523936E-03 | -2.794521E-04 | | |

FIG. 41

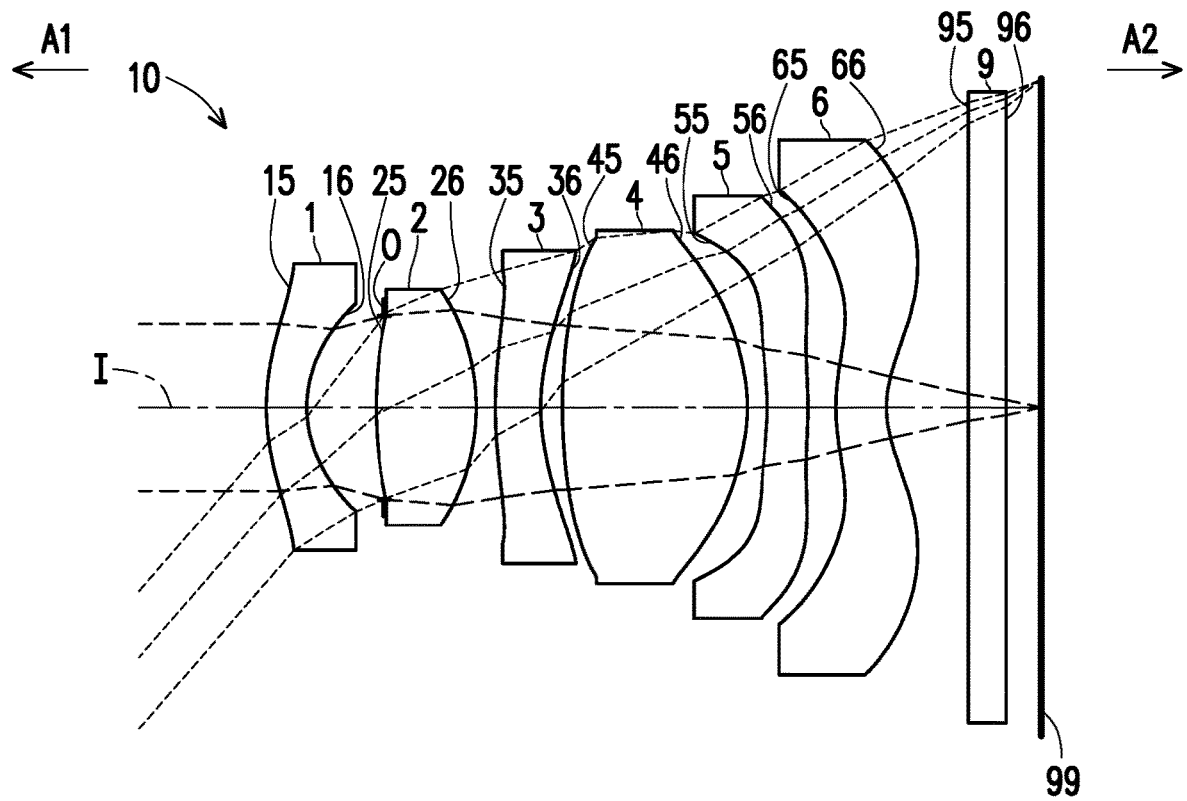
FIG. 42
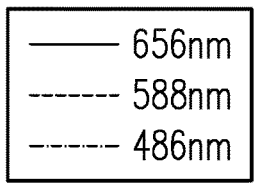
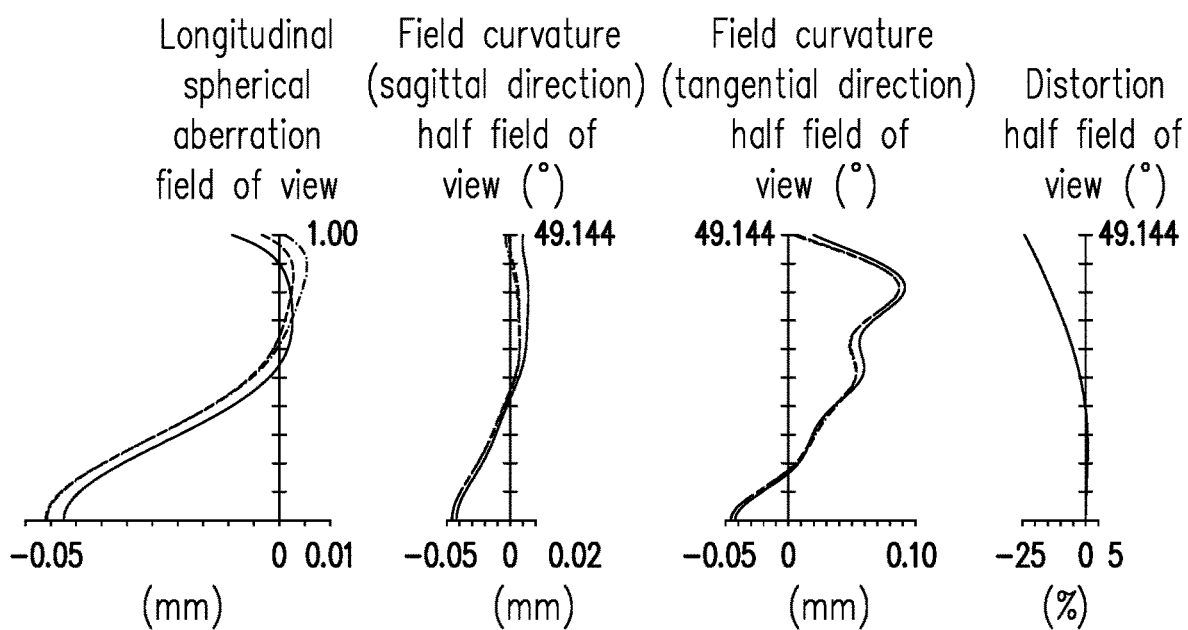
FIG. 43A   FIG. 43B   FIG. 43C   FIG. 43D

| Tenth Embodiment |||||||
|---|---|---|---|---|---|---|
| Effective focal length(EFL)= 2.022 mm , half field of view(HFOV)= 49.144°, system length= 4.270 mm ,F-number(Fno)= 2.200, Image height(ImgH)= 1.810 mm |||||||
| Lens Element | Surface | Radius (mm) | Thickness (mm) | Refractive Index (Nd) | Dispersion Coefficient (Vd) | Focal length(mm) |
| Object | | Infinity | Infinity | | | |
| First lens element 1 | Object-side surface 15 | 1.268 | 0.222 | 1.545 | 55.987 | -2.868 |
| | Image-side surface 16 | 0.656 | 0.427 | | | |
| Aperture 0 | | Infinity | -0.044 | | | |
| Second lens element 2 | Object-side surface 25 | 2.516 | 0.552 | 1.545 | 55.987 | 1.568 |
| | Image-side surface 26 | -1.189 | 0.105 | | | |
| Third lens element 3 | Object-side surface 35 | 2.206 | 0.251 | 1.661 | 20.373 | -3.929 |
| | Image-side surface 36 | 1.138 | 0.119 | | | |
| Fourth lens element 4 | Object-side surface 45 | 3.158 | 1.017 | 1.545 | 55.987 | 1.511 |
| | Image-side surface 46 | -0.984 | 0.112 | | | |
| Fifth lens element 5 | Object-side surface 55 | -1.399 | 0.225 | 1.661 | 20.373 | -5.512 |
| | Image-side surface 56 | -2.418 | 0.153 | | | |
| Sixth lens element 6 | Object-side surface 65 | 1.119 | 0.279 | 1.545 | 55.987 | -2.862 |
| | Image-side surface 66 | 0.594 | 0.449 | | | |
| Filter 9 | Object-side surface 95 | Infinity | 0.210 | 1.517 | 64.167 | |
| | Image-side surface 96 | Infinity | 0.193 | | | |
| | Image Plane 99 | Infinity | | | | |

FIG. 44

| Surface | K | $a_4$ | $a_6$ | $a_8$ | $a_{10}$ |
|---|---|---|---|---|---|
| 15 | 0.000000E+00 | -2.209135E-01 | -3.092077E-01 | 4.522924E-01 | -7.947083E-01 |
| 16 | 0.000000E+00 | -3.031212E-01 | 1.537105E-01 | -8.909306E+00 | 4.633542E+01 |
| 25 | -3.198466E+00 | 1.036130E-01 | -3.495026E-01 | 2.229086E+00 | -9.966407E+00 |
| 26 | -5.132914E-01 | -3.277398E-02 | 2.573482E-01 | -8.102069E-01 | -2.990286E+00 |
| 35 | 5.685827E+00 | -5.981810E-01 | 2.051540E+00 | -7.705559E+00 | 1.718851E+01 |
| 36 | 3.539510E-01 | -6.671752E-01 | 1.201124E+00 | -2.190926E+00 | 1.139267E+00 |
| 45 | -7.775602E+01 | 2.733248E-01 | -4.417390E-01 | 8.412817E-01 | -1.767242E+00 |
| 46 | -8.529774E-01 | 7.159304E-01 | -1.889186E+00 | 1.589379E+00 | 1.488732E+00 |
| 55 | -1.076831E+01 | 1.353172E+00 | -4.383830E+00 | 5.685852E+00 | -4.385387E+00 |
| 56 | -3.264631E+01 | 1.178754E+00 | -3.535225E+00 | 4.876556E+00 | -3.908454E+00 |
| 65 | -8.067663E-01 | -1.044335E+00 | -2.064272E-01 | 2.322397E+00 | -2.946817E+00 |
| 66 | -3.053759E+00 | -7.451218E-01 | 7.955771E-01 | -5.532211E-01 | 2.383084E-01 |
| Surface | $a_{12}$ | $a_{14}$ | $a_{16}$ | | |
| 15 | 1.508708E+00 | -1.613860E+00 | 5.838123E-01 | | |
| 16 | -1.753115E+02 | 4.162326E+02 | -4.684673E+02 | | |
| 25 | 1.925856E+01 | -6.340148E+00 | -7.937458E+00 | | |
| 26 | 1.494379E+01 | -2.709404E+01 | 2.132866E+01 | | |
| 35 | -2.360950E+01 | 1.639739E+01 | -4.622390E+00 | | |
| 36 | 2.304244E+00 | -4.043997E+00 | 1.661499E+00 | | |
| 45 | 2.883403E+00 | -2.395784E+00 | 7.564963E-01 | | |
| 46 | -3.963251E+00 | 2.664923E+00 | -4.930558E-01 | | |
| 55 | 1.723483E+00 | -6.150592E-01 | 3.418542E-01 | | |
| 56 | 1.721385E+00 | -3.551453E-01 | 2.223279E-02 | | |
| 65 | 1.709426E+00 | -4.778473E-01 | 5.079961E-02 | | |
| 66 | -6.108053E-02 | 8.570341E-03 | -5.694274E-04 | | |

FIG. 45

| Conditional Expression | 1st Embodiment | 2nd Embodiment | 3rd Embodiment | 4th Embodiment | 5th Embodiment |
|---|---|---|---|---|---|
| T1 | 0.370 | 0.230 | 0.239 | 0.217 | 0.225 |
| G12 | 0.408 | 0.393 | 0.452 | 0.429 | 0.349 |
| T2 | 0.557 | 0.490 | 0.694 | 0.567 | 0.382 |
| G23 | 0.037 | 0.039 | 0.030 | 0.078 | 0.020 |
| T3 | 0.382 | 0.250 | 0.412 | 0.216 | 0.341 |
| G34 | 0.090 | 0.106 | 0.097 | 0.132 | 0.079 |
| T4 | 0.835 | 0.939 | 1.041 | 1.234 | 1.001 |
| G45 | 0.208 | 0.198 | 0.242 | 0.184 | 0.128 |
| T5 | 0.375 | 0.334 | 0.304 | 0.217 | 0.274 |
| G56 | 0.031 | 0.052 | 0.142 | 0.177 | 0.031 |
| T6 | 0.299 | 0.240 | 0.291 | 0.249 | 0.288 |
| G6F | 0.449 | 0.449 | 0.449 | 0.449 | 0.405 |
| TF | 0.210 | 0.210 | 0.210 | 0.210 | 0.210 |
| GFP | 0.326 | 0.236 | 0.313 | 0.566 | 0.231 |
| BFL | 0.985 | 0.895 | 0.972 | 1.225 | 0.846 |
| EFL | 2.161 | 2.017 | 1.360 | 2.050 | 1.937 |
| TL | 3.591 | 3.270 | 3.944 | 3.701 | 3.117 |
| TTL | 4.576 | 4.165 | 4.916 | 4.926 | 3.963 |
| ALT | 2.818 | 2.482 | 2.981 | 2.701 | 2.510 |
| AAG | 0.773 | 0.788 | 0.964 | 1.000 | 0.607 |
| V4 | 55.987 | 55.987 | 55.987 | 55.987 | 55.987 |
| V5 | 20.373 | 20.373 | 20.373 | 20.373 | 20.373 |
| $T_{max}$ | 0.835 | 0.939 | 1.041 | 1.234 | 1.001 |
| $T_{max2}$ | 0.557 | 0.490 | 0.694 | 0.567 | 0.382 |

FIG. 46

| Conditional Expression | 6th Embodiment | 7th Embodiment | 8th Embodiment | 9th Embodiment | 10th Embodiment |
|---|---|---|---|---|---|
| T1 | 0.289 | 0.179 | 0.315 | 0.295 | 0.222 |
| G12 | 0.402 | 0.461 | 0.445 | 0.467 | 0.383 |
| T2 | 0.522 | 0.527 | 0.517 | 0.408 | 0.552 |
| G23 | 0.021 | 0.062 | 0.017 | 0.020 | 0.105 |
| T3 | 0.314 | 0.282 | 0.218 | 0.282 | 0.251 |
| G34 | 0.060 | 0.083 | 0.085 | 0.100 | 0.119 |
| T4 | 0.783 | 0.866 | 0.776 | 0.991 | 1.017 |
| G45 | 0.168 | 0.020 | 0.094 | 0.102 | 0.112 |
| T5 | 0.360 | 0.151 | 0.162 | 0.237 | 0.225 |
| G56 | 0.020 | 0.020 | 0.018 | 0.020 | 0.153 |
| T6 | 0.266 | 0.246 | 0.292 | 0.297 | 0.279 |
| G6F | 0.479 | 0.624 | 0.364 | 0.414 | 0.449 |
| TF | 0.210 | 0.210 | 0.210 | 0.210 | 0.210 |
| GFP | 0.304 | 0.450 | 0.191 | 0.241 | 0.193 |
| BFL | 0.993 | 1.284 | 0.765 | 0.865 | 0.852 |
| EFL | 2.014 | 1.671 | 1.744 | 1.878 | 2.022 |
| TL | 3.204 | 2.898 | 2.937 | 3.219 | 3.418 |
| TTL | 4.197 | 4.182 | 3.703 | 4.083 | 4.270 |
| ALT | 2.533 | 2.253 | 2.279 | 2.509 | 2.546 |
| AAG | 0.671 | 0.645 | 0.658 | 0.710 | 0.872 |
| V4 | 55.987 | 55.690 | 55.987 | 55.987 | 55.987 |
| V5 | 23.529 | 22.437 | 20.373 | 20.373 | 20.373 |
| $T_{max}$ | 0.783 | 0.866 | 0.776 | 0.991 | 1.017 |
| $T_{max2}$ | 0.522 | 0.527 | 0.517 | 0.408 | 0.552 |

FIG. 47

| Conditional Expression | 1st Embodiment | 2nd Embodiment | 3rd Embodiment | 4th Embodiment | 5th Embodiment |
|---|---|---|---|---|---|
| TTL/(G23+T3+G34) | 9.000 | 10.554 | 9.109 | 11.557 | 9.001 |
| $(T_{max} + T_{max2})$/AAG | 1.800 | 1.815 | 1.801 | 1.801 | 2.277 |
| TL/EFL | 1.662 | 1.621 | 2.900 | 1.805 | 1.609 |
| (T1+G12)/T6 | 2.600 | 2.598 | 2.374 | 2.600 | 1.995 |
| (G23+G34+T4)/T5 | 2.565 | 3.250 | 3.849 | 6.644 | 4.021 |
| (T1+T2+T4)/BFL | 1.788 | 1.853 | 2.031 | 1.648 | 1.900 |
| TTL/(T5+G56+T6) | 6.494 | 6.660 | 6.674 | 7.659 | 6.689 |
| ALT/AAG | 3.643 | 3.152 | 3.093 | 2.700 | 4.133 |
| TL/$T_{max}$ | 4.299 | 3.481 | 3.789 | 2.999 | 3.114 |
| (T1+G12+T2)/T3 | 3.495 | 4.453 | 3.359 | 5.613 | 2.801 |
| (T5+T6)/T1 | 1.824 | 2.495 | 2.491 | 2.145 | 2.499 |
| EFL/BFL | 2.194 | 2.252 | 1.399 | 1.674 | 2.290 |
| TTL/AAG | 5.917 | 5.288 | 5.102 | 4.925 | 6.526 |
| TL/(G45+T5+G56) | 5.851 | 5.600 | 5.738 | 6.400 | 7.210 |
| (T2+T3+T4)/T1 | 4.800 | 7.308 | 8.995 | 9.286 | 7.676 |
| ALT/(G12+G45) | 4.573 | 4.203 | 4.294 | 4.405 | 5.261 |
| $T_{max}$ / $T_{max2}$ | 1.500 | 1.917 | 1.500 | 2.176 | 2.622 |
| V4+V5 | 76.360 | 76.360 | 76.360 | 76.360 | 76.360 |

FIG. 48

| Conditional Expression | 6th Embodiment | 7th Embodiment | 8th Embodiment | 9th Embodiment | 10th Embodiment |
|---|---|---|---|---|---|
| TTL/(G23+T3+G34) | 10.626 | 9.802 | 11.605 | 10.158 | 9.003 |
| $(T_{max} + T_{max2})$/AAG | 1.943 | 2.160 | 1.963 | 1.971 | 1.800 |
| TL/EFL | 1.591 | 1.734 | 1.684 | 1.714 | 1.690 |
| (T1+G12)/T6 | 2.599 | 2.599 | 2.599 | 2.569 | 2.168 |
| (G23+G34+T4)/T5 | 2.402 | 6.686 | 5.415 | 4.698 | 5.505 |
| (T1+T2+T4)/BFL | 1.604 | 1.225 | 2.100 | 1.959 | 2.102 |
| TTL/(T5+G56+T6) | 6.501 | 10.018 | 7.843 | 7.379 | 6.499 |
| ALT/AAG | 3.773 | 3.492 | 3.462 | 3.534 | 2.921 |
| TL/$T_{max}$ | 4.093 | 3.345 | 3.787 | 3.248 | 3.360 |
| (T1+G12+T2)/T3 | 3.864 | 4.135 | 5.867 | 4.156 | 4.617 |
| (T5+T6)/T1 | 2.166 | 2.217 | 1.445 | 1.810 | 2.274 |
| EFL/BFL | 2.028 | 1.301 | 2.279 | 2.172 | 2.373 |
| TTL/AAG | 6.253 | 6.482 | 5.625 | 5.753 | 4.899 |
| TL/(G45+T5+G56) | 5.850 | 15.161 | 10.746 | 8.978 | 6.970 |
| (T2+T3+T4)/T1 | 5.603 | 9.349 | 4.801 | 5.702 | 8.204 |
| ALT/(G12+G45) | 4.442 | 4.685 | 4.227 | 4.406 | 5.140 |
| $T_{max}$ / $T_{max2}$ | 1.501 | 1.643 | 1.500 | 2.429 | 1.842 |
| V4+V5 | 79.516 | 78.127 | 76.360 | 76.360 | 76.360 |

FIG. 49

OPTICAL IMAGING LENS

CROSS-REFERENCE TO RELATED APPLICATION

This application claims the priority benefit of China application serial no. 202010504458.6, filed on Jun. 5, 2020. The entirety of the above-mentioned patent application is hereby incorporated by reference herein and made a part of this specification.

BACKGROUND

Technical Field

The disclosure relates to an optical device, and particularly relates to an optical imaging lens.

Description of Related Art

In recent years, optical imaging lenses are being developed progressively, and the demanded scope of application has become much broader. In addition to requiring the imaging lens to be light, thin, and short, the design of a small F-number (Fno) is conducive to improving luminous flux, and a large field of view has gradually become a trend. Therefore, how to design an optical imaging lens that has both lightness, thinness, shortness, small Fno, large field of view, and good imaging quality has become a problem that needs to be challenged and solved.

SUMMARY

The disclosure provides an optical imaging lens having small volume, small Fno, large field of view and favorable imaging quality.

An embodiment of the disclosure provides an optical imaging lens. The optical imaging lens includes a first lens element, a second lens element, a third lens element, a fourth lens element, a fifth lens element and a sixth lens element arranged in sequence from an object side to an image side along an optical axis. Each of the first lens element to the sixth lens element includes an object-side surface facing the object side and allowing an imaging ray to pass through and an image-side surface facing the image side and allowing the imaging ray to pass through. The first lens element having negative refracting power, and an optical axis region of the object-side surface of the first lens element is convex. A periphery region of the object-side surface of the second lens element is convex, and an optical axis region of the image-side surface of the second lens element is convex. An optical axis region of the object-side surface of the third lens element is convex. An optical axis region of the object-side surface of the fourth lens element is convex. An optical axis region of the image-side surface of the fifth lens element is convex. A periphery region of the image-side surface of the sixth lens element is convex. The optical imaging lens only has the abovementioned six lenses. Each of the first lens element to the sixth lens element has a thickness along the optical axis, two of thicknesses of the first to the fourth lens elements along the optical axis are the thickest and the second thickest among the abovementioned six lens elements respectively.

An embodiment of the disclosure provides an optical imaging lens. The optical imaging lens includes a first lens element, a second lens element, a third lens element, a fourth lens element, a fifth lens element and a sixth lens element arranged in sequence from an object side to an image side along an optical axis, wherein each of the first lens element to the sixth lens element includes an object-side surface facing the object side and allowing an imaging ray to pass through and an image-side surface facing the image side and allowing the imaging ray to pass through. The first lens element having negative refracting power, and an optical axis region of the object-side surface of the first lens element is convex. An optical axis region of the object-side surface of the second lens element is convex, and a periphery region of the image-side surface of the second lens element is convex. An optical axis region of the object-side surface of the third lens element is convex. An optical axis region of the object-side surface of the fourth lens element is convex, and a periphery region of the image-side surface of the fourth lens element is convex. An optical axis region of the image-side surface of the fifth lens element is convex. The optical imaging lens only has the abovementioned six lenses. Each of the first lens element to the sixth lens element has a thickness along the optical axis, and two of thicknesses of the first to the fourth lens elements along the optical axis are the thickest and the second thickest among the abovementioned six lens elements respectively.

An embodiment of the disclosure provides an optical imaging lens. An optical imaging lens includes a first lens element, a second lens element, a third lens element, a fourth lens element, a fifth lens element and a sixth lens element arranged in sequence from an object side to an image side along an optical axis. Each of the first lens element to the sixth lens element includes an object-side surface facing the object side and allowing an imaging ray to pass through and an image-side surface facing the image side and allowing the imaging ray to pass through. The first lens element having negative refracting power, and a periphery region of the object-side surface of the first lens element is convex. An optical axis region of the object-side surface of the second lens element is convex, and a periphery region of the image-side surface of the second lens element is convex. An optical axis region of the object-side surface of the third lens element is convex. An optical axis region of the object-side surface of the fourth lens element is convex, and a periphery region of the image-side surface of the fourth lens element is convex. An optical axis region of the image-side surface of the fifth lens element is convex. The optical imaging lens only has the abovementioned six lenses. Each of the first lens element to the sixth lens element has a thickness along the optical axis, two of thicknesses of the first to the fourth lens elements along the optical axis are the thickest and the second thickest among the abovementioned six lens elements respectively.

An embodiment of the disclosure provides an optical imaging lens. An optical imaging lens includes a first lens element, a second lens element, a third lens element, a fourth lens element, a fifth lens element and a sixth lens element arranged in sequence from an object side to an image side along an optical axis. Each of the first lens element to the sixth lens element includes an object-side surface facing the object side and allowing an imaging ray to pass through and an image-side surface facing the image side and allowing the imaging ray to pass through. The first lens element has negative refracting power, and a periphery region of the object-side surface of the first lens element is convex. The second lens element has positive refracting power. An optical axis region of the object-side surface of the third lens element is convex. A periphery region of the image-side surface of the third lens element is concave. An optical axis region of the image-side surface of the fifth lens element is convex. A periphery region of the object-side surface of the sixth lens element is concave. The optical imaging lens only has the abovementioned six lenses, and complies with the following conditional expression: V4+V5≤80.000, wherein V4 is an abbe number of the fourth lens element and V5 is an abbe number of the fifth lens element. Each of the first lens element to the sixth lens element has a thickness along the optical axis, two of thicknesses of the first to the fourth lens elements along the optical axis are the thickest and the second thickest among the abovementioned six lens elements respectively.

An embodiment of the disclosure provides an optical imaging lens. An optical imaging lens includes a first lens element, a second lens element, a third lens element, a fourth lens element, a fifth lens element and a sixth lens element arranged in sequence from an object side to an image side along an optical axis. Each of the first lens element to the sixth lens element includes an object-side surface facing the object side and allowing an imaging ray to pass through and an image-side surface facing the image side and allowing the imaging ray to pass through. The first lens element has negative refracting power, and an optical axis region of the image-side surface of the first lens element is concave. The second lens element has positive refracting power. An optical axis region of the object-side surface of the third lens element is convex. A periphery region of the image-side surface of the third lens element is concave. An optical axis region of the image-side surface of the fifth lens element is convex. A periphery region of the object-side surface of the sixth lens element is concave, and an optical axis region of the image-side surface of the sixth lens element is concave. The optical imaging lens only has the abovementioned six lenses, and complies with the following conditional expression: V4+V5≤80.000, wherein V4 is an abbe number of the fourth lens element and V5 is an abbe number of the fifth lens element. Each of the first lens element to the sixth lens element has a thickness along the optical axis, two of thicknesses of the first to the fourth lens elements along the optical axis are the thickest and the second thickest among the abovementioned six lens elements respectively.

An embodiment of the disclosure provides an optical imaging lens. An optical imaging lens includes a first lens element, a second lens element, a third lens element, a fourth lens element, a fifth lens element and a sixth lens element arranged in sequence from an object side to an image side along an optical axis. Each of the first lens element to the sixth lens element includes an object-side surface facing the object side and allowing an imaging ray to pass through and an image-side surface facing the image side and allowing the imaging ray to pass through. The first lens element has negative refracting power. The second lens element has positive refracting power. An optical axis region of the object-side surface of the third lens element is convex. A periphery region of the image-side surface of the third lens element is concave. An optical axis region of the image-side surface of the fifth lens element is convex. A periphery region of the image-side surface of the fifth lens element is convex. A periphery region of the object-side surface of the sixth lens element is concave, and an optical axis region of the image-side surface of the sixth lens element is concave. The optical imaging lens only has the abovementioned six lenses, and complies with the following conditional expression: V4+V5≤80.000, wherein V4 is an abbe number of the fourth lens element and V5 is an abbe number of the fifth lens element. Each of the first lens element to the sixth lens element has a thickness along the optical axis, two of thicknesses of the first to the fourth lens elements along the optical axis are the thickest and the second thickest among the abovementioned six lens elements respectively.

Based on the above, the optical imaging lens according to the embodiments of the disclosure renders the following beneficial effect. That is, by satisfying the condition on refracting power, design of surface shape and the thickness arrangement, the optical imaging lens may have small volume, small Fno, large field of view and favorable imaging quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 is a schematic diagram illustrating an optical imaging lens according to a first embodiment of the disclosure.

FIGS. 7A to 7D are diagrams illustrating a longitudinal spherical aberration and various aberrations of the optical imaging lens according to the first embodiment.

FIG. 8 shows detailed optical data of the optical imaging lens according to the first embodiment of the disclosure.

FIG. 9 shows aspheric parameters pertaining to the optical imaging lens according to the first embodiment of the disclosure.

FIG. 10 is a schematic diagram illustrating an optical imaging lens according to a second embodiment of the disclosure.

FIGS. 11A to 11D are diagrams illustrating a longitudinal spherical aberration and various aberrations of the optical imaging lens according to the second embodiment.

FIG. 12 shows detailed optical data of the optical imaging lens according to the second embodiment of the disclosure.

FIG. 13 shows aspheric parameters pertaining to the optical imaging lens according to the second embodiment of the disclosure.

FIG. 14 is a schematic diagram illustrating an optical imaging lens according to a third embodiment of the disclosure.

FIGS. 15A to 15D are diagrams illustrating a longitudinal spherical aberration and various aberrations of the optical imaging lens according to the third embodiment.

FIG. 16 shows detailed optical data of the optical imaging lens according to the third embodiment of the disclosure.

FIG. 17 shows aspheric parameters pertaining to the optical imaging lens according to the third embodiment of the disclosure.

FIG. 18 is a schematic diagram illustrating an optical imaging lens according to a fourth embodiment of the disclosure.

FIGS. 19A to 19D are diagrams illustrating a longitudinal spherical aberration and various aberrations of the optical imaging lens according to the fourth embodiment.

FIG. 20 shows detailed optical data of the optical imaging lens according to the fourth embodiment of the disclosure.

FIG. 21 shows aspheric parameters pertaining to the optical imaging lens according to the fourth embodiment of the disclosure.

FIG. 22 is a schematic diagram illustrating an optical imaging lens according to a fifth embodiment of the disclosure.

FIGS. 23A to 23D are diagrams illustrating a longitudinal spherical aberration and various aberrations of the optical imaging lens according to the fifth embodiment.

FIG. 24 shows detailed optical data of the optical imaging lens according to the fifth embodiment of the disclosure.

FIG. 25 shows aspheric parameters pertaining to the optical imaging lens according to the fifth embodiment of the disclosure.

FIG. 26 is a schematic diagram illustrating an optical imaging lens according to a sixth embodiment of the disclosure.

FIGS. 27A to 27D are diagrams illustrating a longitudinal spherical aberration and various aberrations of the optical imaging lens according to the sixth embodiment.

FIG. 28 shows detailed optical data of the optical imaging lens according to the sixth embodiment of the disclosure.

FIG. 29 shows aspheric parameters pertaining to the optical imaging lens according to the sixth embodiment of the disclosure.

FIG. 30 is a schematic diagram illustrating an optical imaging lens according to a seventh embodiment of the disclosure.

FIGS. 31A to 31D are diagrams illustrating a longitudinal spherical aberration and various aberrations of the optical imaging lens according to the seventh embodiment.

FIG. 32 shows detailed optical data of the optical imaging lens according to the seventh embodiment of the disclosure.

FIG. 33 shows aspheric parameters pertaining to the optical imaging lens according to the seventh embodiment of the disclosure.

FIG. 34 is a schematic diagram illustrating an optical imaging lens according to an eighth embodiment of the disclosure.

FIGS. 35A to 35D are diagrams illustrating a longitudinal spherical aberration and various aberrations of the optical imaging lens according to the eighth embodiment.

FIG. 36 shows detailed optical data of the optical imaging lens according to the eighth embodiment of the disclosure.

FIG. 37 shows aspheric parameters pertaining to the optical imaging lens according to the eighth embodiment of the disclosure.

FIG. 38 is a schematic diagram illustrating an optical imaging lens according to a ninth embodiment of the disclosure.

FIGS. 39A to 39D are diagrams illustrating a longitudinal spherical aberration and various aberrations of the optical imaging lens according to the ninth embodiment.

FIG. 40 shows detailed optical data of the optical imaging lens according to the ninth embodiment of the disclosure.

FIG. 41 shows aspheric parameters pertaining to the optical imaging lens according to the ninth embodiment of the disclosure.

FIG. 42 is a schematic diagram illustrating an optical imaging lens according to a tenth embodiment of the disclosure.

FIGS. 43A to 43D are diagrams illustrating a longitudinal spherical aberration and various aberrations of the optical imaging lens according to the tenth embodiment.

FIG. 44 shows detailed optical data of the optical imaging lens according to the tenth embodiment of the disclosure.

FIG. 45 shows aspheric parameters pertaining to the optical imaging lens according to the tenth embodiment of the disclosure.

FIGS. 46 and 48 show values of respective important parameters and relations thereof of the optical imaging lenses according to the first through fifth embodiments of the disclosure.

FIGS. 47 and 49 show values of respective important parameters and relations thereof of the optical imaging lenses according to the sixth through tenth embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
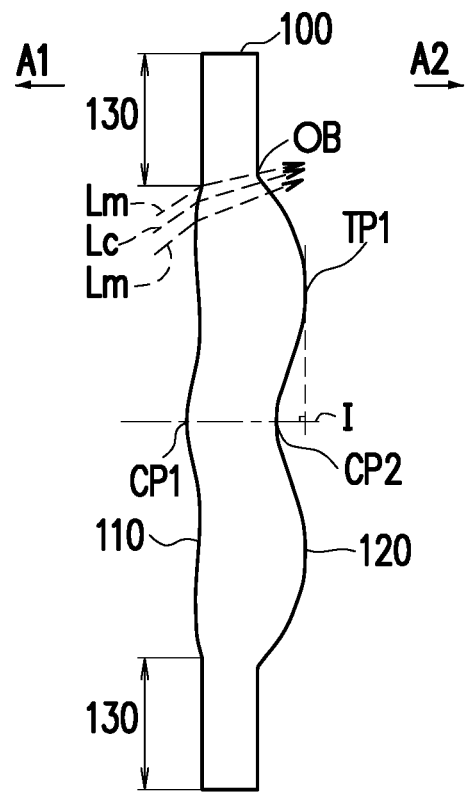
FIG. 1 is a schematic diagram illustrating a surface shape structure of a lens.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
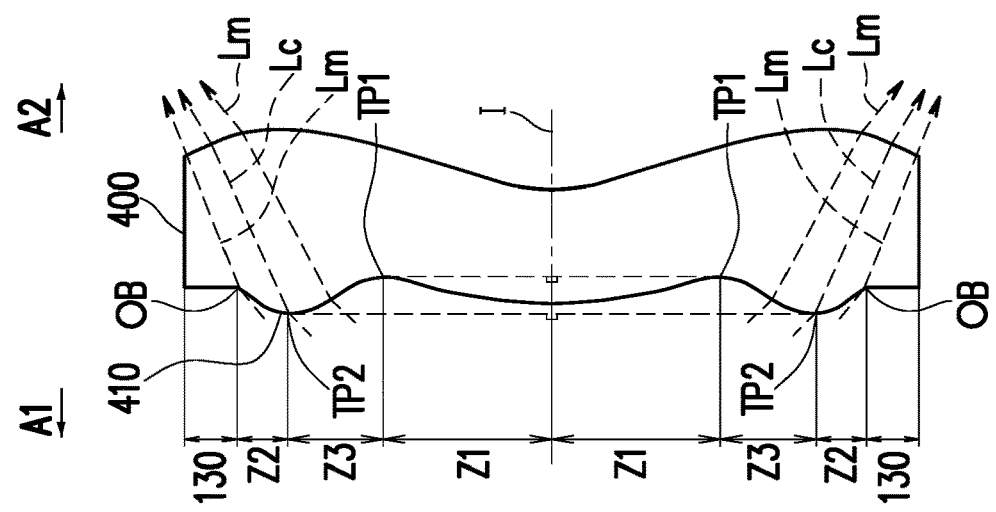
FIG. 4 is a schematic diagram illustrating a surface shape structure of a lens according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
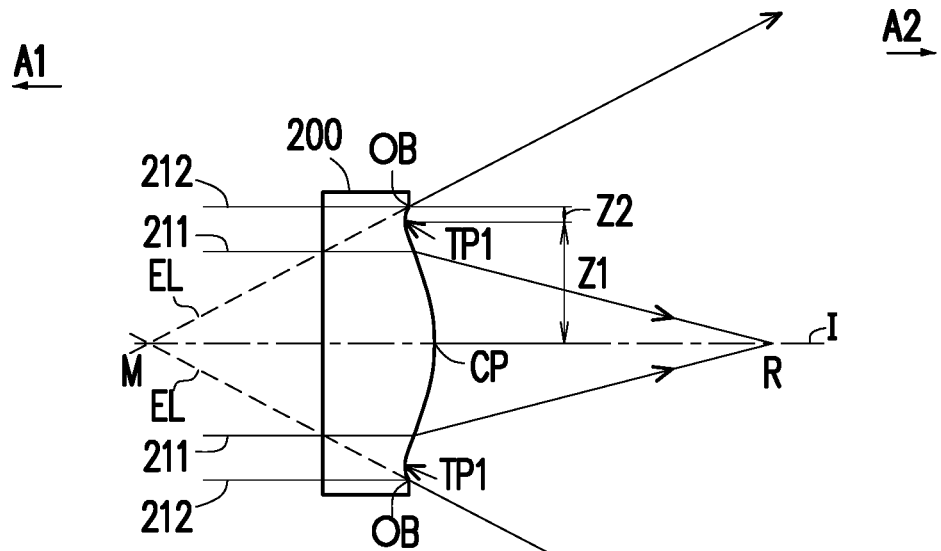
FIG. 2 is a schematic diagram illustrating surface shape concave and convex structures and a light focal point of a lens.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
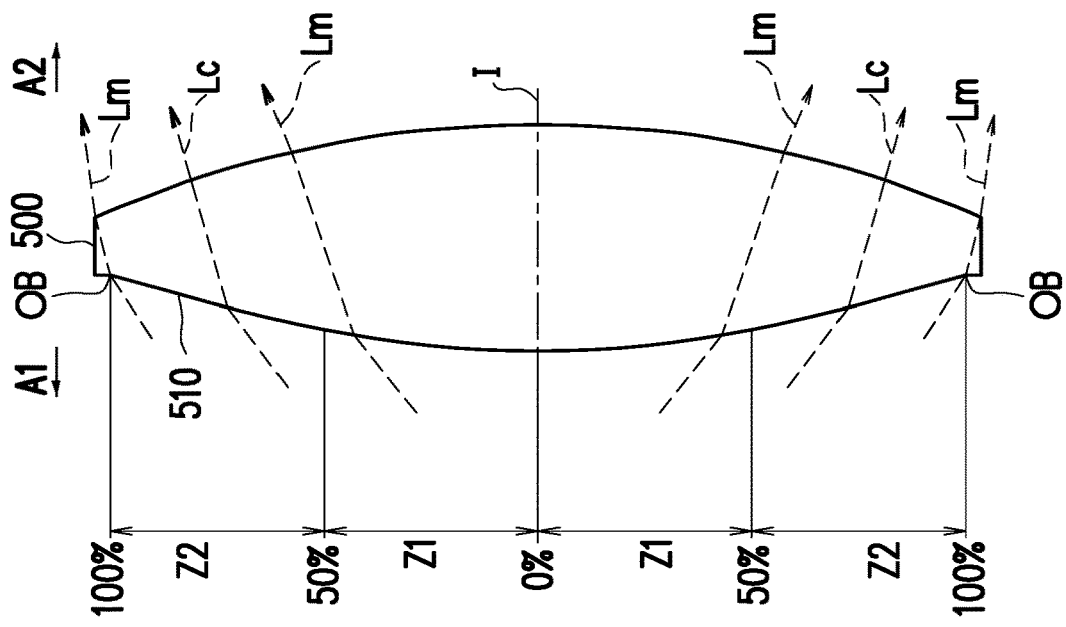
FIG. 5 is a schematic diagram illustrating a surface shape structure of a lens according to Example 3.
Figure 3:
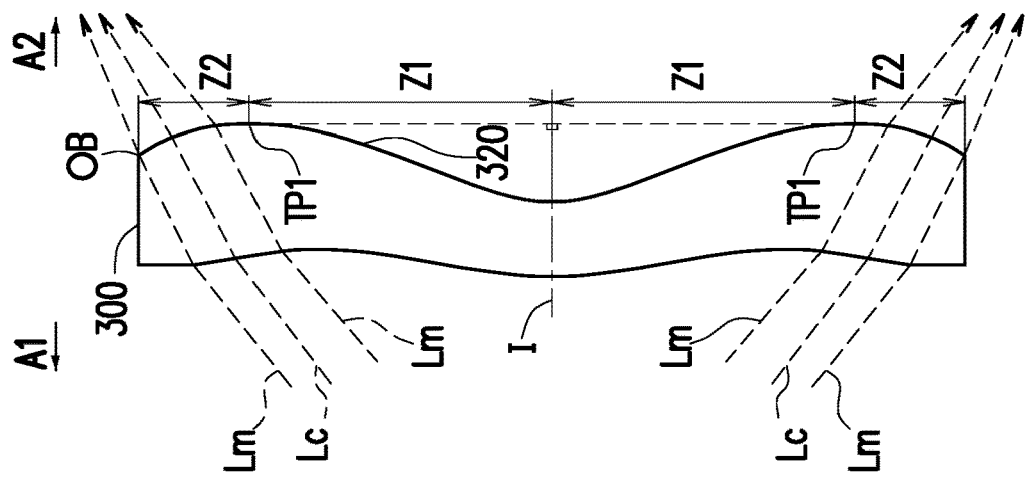
FIG. 3 is a schematic diagram illustrating a surface shape structure of a lens according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the disclosure, and FIGS. 7A to 7D are diagrams illustrating a longitudinal spherical aberration and various aberrations of the optical imaging lens according to the first embodiment. Referring to FIG. 6, an optical imaging lens 10 of the first embodiment of the disclosure includes a first lens element 1, an aperture 0, a second lens element 2, a third lens element 3, a fourth lens element 4, a fifth lens element 5, a sixth lens element 6 and a filter 9 (e.g., an IR cut filter) arranged in sequence from an object side A1 to an image side A2 along an optical axis I of the optical imaging lens 10. When rays emitted from an object to be shot enter the optical imaging lens 10 and pass in sequence through the first lens element 1, the aperture 0, the second lens element 2, the third lens element 3, the fourth lens element 4, the fifth lens element 5, the sixth lens element 6 and the filter 9, an image may be formed on an image plane 99. It should be noted that the object side is a side facing the object to be shot, and the image side is a side facing the image plane 99.

The first lens element 1, the second lens element 2, the third lens element 3, the fourth lens element 4, the fifth lens element 5, the sixth lens element 6, and the filter 9 of the optical imaging lens 10 respectively have object-side surfaces 15, 25, 35, 45, 55, 65, and 95 facing the object side and allowing imaging rays to pass through, and respectively have image-side surfaces 16, 26, 36, 46, 56, 66, and 96 facing the image side and allowing the imaging rays to pass through.

The first lens element 1 has negative refracting power. The material of the first lens element 1 is plastics. An optical axis region 151 of the object-side surface 15 of the first lens element 1 is convex, and its periphery region 153 is convex. An optical axis region 162 of the image-side surface 16 of the first lens element 1 is concave, and its periphery region 164 is concave. In the present embodiment, both the object-side surface 15 and the image-side surface 16 of the first lens element 1 are aspheric surfaces. However, the disclosure is not limited thereto.

The second lens element 2 has positive refracting power. The material of the second lens element 2 is plastics. An optical axis region 251 of the object-side surface 25 of the second lens element 2 is convex, and its periphery region 253 is convex. An optical axis region 261 of the image-side surface 26 of the second lens element 2 is convex, and its periphery region 263 is convex. In the present embodiment, both the object-side surface 25 and the image-side surface 26 of the second lens element 2 are aspheric surfaces. However, the disclosure is not limited thereto.

The third lens element 3 has negative refracting power. The material of the third lens element 3 is plastics. An optical axis region 351 of the object-side surface 35 of the third lens element 3 is convex, and its periphery region 353 is concave. An optical axis region 361 of the image-side surface 36 of the third lens element 3 is concave, and its periphery region 363 is concave. In the present embodiment, both the object-side surface 35 and the image-side surface 36 of the third lens element 3 are aspheric surfaces. However, the disclosure is not limited thereto.

The fourth lens element 4 has positive refracting power. The material of the fourth lens element 4 is plastics. An optical axis region 451 of the object-side surface 45 of the fourth lens element 4 is convex, and its periphery region 453 is convex. An optical axis region 461 of the image-side surface 46 of the fourth lens element 4 is convex, and its periphery region 463 is convex. In the present embodiment, both the object-side surface 45 and the image-side surface 46 of the fourth lens element 4 are aspheric surfaces. However, the disclosure is not limited thereto.

The fifth lens element 5 has negative refracting power. The material of the fifth lens element 5 is plastics. An optical axis region 552 of the object-side surface 55 of the fifth lens element 5 is concave, and its periphery region 554 is concave. An optical axis region 561 of the image-side surface 56 of the fifth lens element 5 is convex, and its periphery region 563 is convex. In the present embodiment, both the object-side surface 55 and the image-side surface 56 of the fifth lens element 5 are aspheric surfaces. However, the disclosure is not limited thereto.

The sixth lens element 6 has negative refracting power. The sixth lens element 6 is made of plastics. An optical axis region 651 of the object-side surface 65 of the sixth lens element 6 is convex, and its periphery region 654 is concave. An optical axis region 662 of the image-side surface 66 of the sixth lens element 6 is concave, and its periphery region 663 is convex. In the present embodiment, both the object-side surface 65 and the image-side surface 66 of the sixth lens element 6 are aspheric surfaces. However, the disclosure is not limited thereto.

In the first embodiment, only the above six lens elements have refracting power among lens elements of the optical imaging lens 10.

Other detailed optical data of the first embodiment are as shown in FIG. 8. Moreover, in the optical imaging lens 10 of the first embodiment, an effective focal length (EFL) of the whole system is 2.161 millimeters (mm), a half field of view (HFOV) is 52.995°, an F-number (Fno) is 2.200, a system length thereof is 4.576 mm, and an image height is 1.810 mm. The system length refers to a distance from the object-side surface 15 of the first lens element 1 to the image plane 99 along the optical axis I.

In addition, in the present embodiment, a total of twelve surfaces, namely the object-side surfaces 15, 25, 35, 45, 55 and 65 and the image-side surfaces 16, 26, 36, 46, 56 and 66, of the first lens element 1, the second lens element 2, the third lens element 3, the fourth lens element 4, the fifth lens element 5 and the sixth lens element 6 are all aspheric surfaces. Besides, the object-side surfaces 15, 25, 35, 45, 55 and 65 and the image-side surfaces 16, 26, 36, 46, 56 and 66 are general aspheric surfaces. These aspheric surfaces are defined by the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i \tag{1}$$

Specifically,

Y represents a distance from a point on an aspheric curve to the optical axis I;

Z represents a depth of the aspheric surface (i.e., a perpendicular distance between the point on the aspheric surface that is spaced by the distance Y from the optical axis I and a tangent plane tangent to a vertex of the aspheric surface along the optical axis I);

R represents a radius of curvature of the surface of the lens element in a vicinity of the optical axis I;

K represents a conic constant;

$a_i$: an $i^{th}$ aspheric coefficient.

Respective aspheric coefficients from the object-side surface 15 of the first lens element 1 to the image-side surface 66 of the sixth lens element 6 in Formula (1) are as shown in FIG. 9. In FIG. 9, the row of number "15" indicates aspheric coefficients of the object-side surface 15 of the first lens element 1, and the other rows are defined in a similar manner. Besides, in all of the embodiment of the present disclosure, aspheric coefficient $a_2$ is 0; therefore, aspheric coefficient $a_2$ is omitted.

In addition, relations of important parameters in the optical imaging lens 10 of the first embodiment are as shown in FIGS. 46 and 48.

Specifically,

T1 represents a thickness of the first lens element 1 along the optical axis I;

T2 represents a thickness of the second lens element 2 along the optical axis I;

T3 represents a thickness of the third lens element 3 along the optical axis I;

T4 represents a thickness of the fourth lens element 4 along the optical axis I;

T5 represents a thickness of the fifth lens element 5 along the optical axis I;

T6 represents a thickness of the sixth lens element 6 along the optical axis I;

TF represents a thickness of the filter 9 along the optical axis I;

$T_{max}$ represents the thickest lens element thickness of the first lens element 1 to the sixth lens element 6, i.e., the maximum value of the T1, T2, T3, T4, T5 and T6;

$T_{max2}$ represents the second thickest lens element thickness of the first lens element 1 to the sixth lens element 6, i.e., the second maximum value of the T1, T2, T3, T4, T5 and T6;

G12 represents a distance from the image-side surface 16 of the first lens element 1 to the object-side surface 25 of the second lens element 2 along the optical axis I, i.e., an air gap between the first lens element 1 and the second lens element 2 along the optical axis I;

G23 represents a distance from the image-side surface 26 of the second lens element 2 to the object-side surface 35 of the third lens element 3 along the optical axis I, i.e., an air gap between the second lens element 2 and the third lens element 3 along the optical axis I;

G34 represents a distance from the image-side surface 36 of the third lens element 3 to the object-side surface 45 of the fourth lens element 4 along the optical axis I, i.e., an air gap between the third lens element 3 and the fourth lens element 4 along the optical axis I;

G45 represents a distance from the image-side surface 46 of the fourth lens element 4 to the object-side surface 55 of the fifth lens element 5 along the optical axis I, i.e., an air gap between the fourth lens element 4 and the fifth lens element 5 along the optical axis I;

G56 represents a distance from the image-side surface 56 of the fifth lens element 5 to the object-side surface 65 of the sixth lens element 6 along the optical axis I, i.e., an air gap between the fifth lens element 5 and the sixth lens element 6 along the optical axis I;

G6F represents a distance from the image-side surface 66 of the sixth lens element 6 to the object-side surface 95 of the filter 9 along the optical axis I;

GFP represents a distance from the image-side surface 95 of the filter 9 to the image plane 99 along the optical axis I, i.e., an air gap between the filter 9 and the image plane 99 along the optical axis I;

AAG represents a sum of the air gaps between the first lens element 1 and the sixth lens element 6 along the optical axis I, i.e., the sum of the five air gaps G12, G23, G34, G45 and G56;

ALT represents a sum of the lens element thicknesses of the first lens element 1, the second lens element 2, the third lens element 3, the fourth lens element 4, the fifth lens element 5, and the sixth lens element 6 along the optical axis I, i.e., the sum of the six lens elements thicknesses T1, T2, T3, T4, T5 and T6;

TTL represents a distance from the object-side surface 15 of the first lens element 1 to the image plane 99 along the optical axis I;

TL represents a distance from the object-side surface 15 of the first lens element 1 to the image-side surface 66 of the sixth lens element 6 along the optical axis I;

BFL represents a distance from the image-side surface 66 of the sixth lens element 6 to the image plane 99 along the optical axis I;

HFOV represents a half field of view of the optical imaging lens 10;

EFL represents an effective focal length of the optical imaging lens 10;

ImgH is an image height of the optical imaging lens 10; and

Fno represents an F-number of the optical imaging lens 10;

In addition, it is defined:

f1 is a focal length of the first lens element 1;

f2 is a focal length of the second lens element 2;

f3 is a focal length of the third lens element 3;

f4 is a focal length of the fourth lens element 4;

f5 is a focal length of the fifth lens element 5;

f6 is a focal length of the sixth lens element 6;

n1 is a refractive index of the first lens element 1;

n2 is a refractive index of the second lens element 2;

n3 is a refractive index of the third lens element 3;

n4 is a refractive index of the fourth lens element 4;

n5 is a refractive index of the fifth lens element 5;

n6 is a refractive index of the sixth lens element 6;

V1 is an Abbe number of the first lens element 1, and the Abbe number is also referred to as dispersion coefficient;

V2 is an Abbe number of the second lens element 2;

V3 is an Abbe number of the third lens element 3;

V4 is an Abbe number of the fourth lens element 4;

V5 is an Abbe number of the fifth lens element 5; and

V6 is an Abbe number of the sixth lens element 6.

From the FIGS. 46 and 47, in the six lens elements 1-6 of the first embodiment, the lens element which has the thickest thickness along the optical axis I is the fourth lens element 4 among the first to the fourth lens elements 1-4, and the lens element which has the second thickest thickness along the optical axis I is the second lens element 2.

Then, referring to FIGS. 7A to 7D, FIG. 7A illustrates a longitudinal spherical aberration in the first embodiment; FIGS. 7B and 7C respectively illustrate field curvature aberrations on the image plane 99 in a sagittal direction and in a tangential direction at wavelengths in the first embodiment; and FIG. 7D illustrates a distortion aberration on the image plane 99 in the first embodiment. In FIG. 7A that illustrates the longitudinal spherical aberration of the first embodiment, curves of each wavelength are close to one another and approach the center, which indicates that off-axis rays of each wavelength at different heights are concentrated around an imaging point. A deviation range of the curve of each wavelength indicates that deviations of the imaging points of the off-axis rays at different heights are controlled within a range of ±0.045 mm. Hence, it is evident that the spherical aberration at the same wavelength can be significantly improved according to the first embodiment. In addition, distances among the three representative wavelengths are quite close, which indicates that imaging positions of the rays of different wavelengths are rather concentrated; therefore, a chromatic aberration can be significantly improved as well.

In FIG. 7B that illustrates field curvature aberration, the field curvature aberration in the sagittal direction falls within ±0.06 mm, in FIG. 7C that illustrates field curvature aberration, the field curvature aberration in the tangential direction falls within ±0.20 mm, which indicates that aberration of the optical system of the first embodiment can be effectively eliminated. In FIG. 7D, the diagram of distortion aberration shows that the distortion aberration of the first embodiment is maintained within a range of ±40.0%, which indicates that the distortion aberration of the first embodiment complies with an imaging quality requirement of the optical system. Accordingly, compared to the existing optical lenses, the first embodiment can still provide good imaging quality under a condition that that the system length is shortened to 4.576 mm. Therefore, according to the first embodiment, a lens length can be shortened and favorable imaging quality can still be provided, while good optical properties are maintained.

FIG. 10 is a schematic diagram illustrating an optical imaging lens according to a second embodiment of the disclosure, and FIGS. 11A to 11D are diagrams illustrating a longitudinal spherical aberration and various aberrations of the optical imaging lens according to the second embodiment. Referring first to FIG. 10, the optical imaging lens 10 according to the second embodiment of the disclosure is roughly similar to that of the first embodiment, but the two differ in the following: the optical data, the aspheric coefficients and the parameters of the lens elements 1, 2, 3, 4, 5 and 6 in the two embodiments are different to some extent. It should be noted that, for clear illustration, some of the reference numerals of the optical axis regions and the periphery regions having similar surface shapes with those of the first embodiment are omitted from FIG. 10.

The detailed optical data of the optical imaging lens 10 of the second embodiment is as shown in FIG. 12. Moreover, in the optical imaging lens 10 of the second embodiment, the EFL of the whole system is 2.017 mm, the HFOV is 52.433°, the Fno is 2.200, the system length is 4.165 mm, and the image height is 1.810 mm.

FIG. 13 shows the various aspheric coefficients of the object-side surface 15 of the first lens element 1 to the image-side surface 66 of the sixth lens element 6 in Formula (1) in the second embodiment.

In addition, relations of important parameters in the optical imaging lens 10 of the second embodiment are as shown in FIGS. 46 and 48.

In FIG. 11A that illustrates the longitudinal spherical aberration in the second embodiment, deviations of the imaging points of the off-axis rays at different heights are controlled within a range of ±0.03 mm. In FIGS. 11B and 11C that illustrate the two field curvature aberrations, astigmatic aberration in the sagittal direction falls within ±0.03 mm, and astigmatic aberration in the tangential direction falls within ±0.07 mm. In FIG. 11D, the diagram of distortion aberration shows that the distortion aberration of the second embodiment is maintained within a range of ±40%. Based on above, compared to the existing optical imaging lens, the second embodiment of the present disclosure still can provide good imaging quality under the condition of system length shortened to 4.165 mm.

Based on above, the advantage of the second embodiment compared to the first embodiment lies in: the system length of the second embodiment is smaller than the system length of the first embodiment. The aberration in the sagittal direction of the second embodiment is smaller than the aberration in the sagittal direction of the first embodiment. The aberration in the tangential direction of the second embodiment is smaller than the aberration in the tangential direction of the first embodiment. The longitudinal spherical aberration of the second embodiment is smaller than the longitudinal spherical aberration of the first embodiment.

FIG. 14 is a schematic diagram illustrating an optical imaging lens according to a third embodiment of the disclosure, and FIGS. 15A to 15D are diagrams illustrating a longitudinal spherical aberration and various aberrations of the optical imaging lens according to the third embodiment. Referring first to FIG. 14, the optical imaging lens 10 according to the third embodiment of the disclosure is roughly similar to that of the first embodiment, but the two differ in the following: the optical data, the aspheric coefficients and the parameters of the lens elements 1, 2, 3, 4, 5 and 6 in the two embodiments are different to some extent. In addition, in the present embodiment, the fifth lens element 5 has positive refracting power. It should be noted that, for clear illustration, some of the reference numerals of the optical axis regions and the periphery regions having similar surface shapes with those of the first embodiment are omitted from FIG. 14.

The detailed optical data of the optical imaging lens 10 of the third embodiment is as shown in FIG. 16. Moreover, in the optical imaging lens 10 of the third embodiment, the EFL of the whole system is 1.360 mm, the HFOV is 53.116°, the Fno is 2.200, the system length is 4.916 mm, and the image height is 1.810 mm.

FIG. 17 shows the various aspheric coefficients of the object-side surface 15 of the first lens element 1 to the image-side surface 66 of the sixth lens element 6 in Formula (1) in the third embodiment.

In addition, relations of important parameters in the optical imaging lens 10 of the third embodiment are as shown in FIGS. 46 and 48.

In FIG. 15A that illustrates the longitudinal spherical aberration in the third embodiment, deviations of the imaging points of the off-axis rays at different heights are controlled within a range of ±0.5 mm. In FIGS. 15B and 15C that illustrate the two field curvature aberrations, astigmatic aberration in the sagittal direction falls within ±0.5 mm, and astigmatic aberration in the tangential direction falls within ±0.5 mm. In FIG. 15D, the diagram of distortion aberration shows that the distortion aberration of the third embodiment is maintained within a range of ±25%. Based on above, compared to the existing optical imaging lens, the third embodiment of the present disclosure still can provide good imaging quality under the condition of system length shortened to 4.916 mm.

Based on above, the advantage of the third embodiment compared to the first embodiment lies in: the HFOV of the third embodiment is greater than the HFOV of the first embodiment. The distortion aberration of the third embodiment is smaller than the distortion aberration of the first embodiment.

FIG. 18 is a schematic diagram illustrating an optical imaging lens according to a fourth embodiment of the disclosure, and FIGS. 19A to 19D are diagrams illustrating a longitudinal spherical aberration and various aberrations of the optical imaging lens according to the fourth embodiment. Referring first to FIG. 18, the optical imaging lens 10 according to the fourth embodiment of the disclosure is roughly similar to that of the first embodiment, but the two differ in the following: the optical data, the aspheric coefficients and the parameters of the lens elements 1, 2, 3, 4, 5 and 6 in the two embodiments are different to some extent. In addition, in the present embodiment, the periphery region 353 of the object-side surface 35 the third lens element 3 is convex. It should be noted that, for clear illustration, some of the reference numerals of the optical axis regions and the periphery regions having similar surface shapes with those of the first embodiment are omitted from FIG. 18.

The detailed optical data of the optical imaging lens 10 of the fourth embodiment is as shown in FIG. 20. Moreover, in the optical imaging lens 10 of the fourth embodiment, the EFL of the whole system is 2.050 mm, the HFOV is 47.095°, the Fno is 2.200, the system length is 4.926 mm, and the image height is 1.810 mm.

FIG. 21 shows the various aspheric coefficients of the object-side surface 15 of the first lens element 1 to the image-side surface 66 of the sixth lens element 6 in Formula (1) in the fourth embodiment.

In addition, relations of important parameters in the optical imaging lens 10 of the fourth embodiment are as shown in FIGS. 46 and 48.

In FIG. 19A that illustrates the longitudinal spherical aberration in the fourth embodiment, deviations of the imaging points of the off-axis rays at different heights are controlled within a range of ±0.35 mm. In FIGS. 19B and 19C that illustrate the two field curvature aberrations, astigmatic aberration in the sagittal direction falls within ±0.35 mm, and astigmatic aberration in the tangential direction falls within ±0.35 mm. In FIG. 19D, the diagram of distortion aberration shows that the distortion aberration of the fourth embodiment is maintained within a range of ±30%. Based on above, compared to the existing optical imaging lens, the fourth embodiment of the present disclosure still can provide good imaging quality under the condition of system length shortened to 4.926 mm.

Based on above, the advantage of the fourth embodiment compared to the first embodiment lies in: the distortion aberration of the fourth embodiment is smaller than the distortion aberration of the first embodiment.

FIG. 22 is a schematic diagram illustrating an optical imaging lens according to a fifth embodiment of the disclosure, and FIGS. 23A to 23D are diagrams illustrating a longitudinal spherical aberration and various aberrations of the optical imaging lens according to the fifth embodiment. Referring first to FIG. 22, the optical imaging lens 10 according to the fifth embodiment of the disclosure is roughly similar to that of the first embodiment, but the two differ in the following: the optical data, the aspheric coefficients and the parameters of the lens elements 1, 2, 3, 4, 5 and 6 in the two embodiments are different to some extent. It should be noted that, for clear illustration, some of the reference numerals of the optical axis regions and the periphery regions having similar surface shapes with those of the first embodiment are omitted from FIG. 22.

The detailed optical data of the optical imaging lens 10 of the fifth embodiment is as shown in FIG. 24. Moreover, in the optical imaging lens 10 of the fifth embodiment, the EFL of the whole system is 1.937 mm, the HFOV is 55.363°, the Fno is 2.200, the system length is 3.963 mm, and the image height is 1.865 mm.

FIG. 25 shows the various aspheric coefficients of the object-side surface 15 of the first lens element 1 to the image-side surface 66 of the sixth lens element 6 in Formula (1) in the fifth embodiment.

In addition, relations of important parameters in the optical imaging lens 10 of the fifth embodiment are as shown in FIGS. 46 and 48.

In FIG. 23A that illustrates the longitudinal spherical aberration in the fifth embodiment, deviations of the imaging points of the off-axis rays at different heights are controlled within a range of ±0.018 mm. In FIGS. 23B and 23C that illustrate the two field curvature aberrations, astigmatic aberration in the sagittal direction falls within ±0.02 mm, and astigmatic aberration in the tangential direction falls within ±0.08 mm. In FIG. 23D, the diagram of distortion aberration shows that the distortion aberration of the fifth embodiment is maintained within a range of ±35%. Based on above, compared to the existing optical imaging lens, the fifth embodiment of the present disclosure still can provide good imaging quality under the condition of system length shortened to 3.963 mm.

Based on above, the advantage of the fifth embodiment compared to the first embodiment lies in: the system length of the fifth embodiment is smaller than the system length of the first embodiment. The HFOV of the fifth embodiment is greater than the HFOV of the first embodiment. The longitudinal spherical aberration of the fifth embodiment is smaller than the longitudinal spherical aberration of the first embodiment. The aberration in the sagittal direction of the fifth embodiment is smaller than the aberration in the sagittal direction of the first embodiment. The aberration in the tangential direction of the fifth embodiment is smaller than the aberration in the tangential direction of the first embodiment. The distortion aberration of the fifth embodiment is smaller than the distortion aberration of the first embodiment.

FIG. 26 is a schematic diagram illustrating an optical imaging lens according to a sixth embodiment of the disclosure, and FIGS. 27A to 27D are diagrams illustrating a longitudinal spherical aberration and various aberrations of the optical imaging lens according to the sixth embodiment. Referring first to FIG. 26, the optical imaging lens 10 according to the sixth embodiment of the disclosure is roughly similar to that of the first embodiment, but the two differ in the following: the optical data, the aspheric coefficients and the parameters of the lens elements 1, 2, 3, 4, 5 and 6 in the two embodiments are different to some extent. In addition, in the present embodiment, the periphery region 363 of the image-side surface 36 the third lens element 3 is convex. It should be noted that, for clear illustration, some of the reference numerals of the optical axis regions and the periphery regions having similar surface shapes with those of the first embodiment are omitted from FIG. 26.

The detailed optical data of the optical imaging lens 10 of the sixth embodiment is as shown in FIG. 28. Moreover, in the optical imaging lens 10 of the sixth embodiment, the EFL of the whole system is 2.014 mm, the HFOV is 55.363°, the Fno is 2.200, the system length is 4.197 mm, and the image height is 1.865 mm.

FIG. 29 shows the various aspheric coefficients of the object-side surface 15 of the first lens element 1 to the image-side surface 66 of the sixth lens element 6 in Formula (1) in the sixth embodiment.

In addition, relations of important parameters in the optical imaging lens 10 of the sixth embodiment are as shown in FIGS. 47 and 49.

In FIG. 27A that illustrates the longitudinal spherical aberration in the sixth embodiment, deviations of the imaging points of the off-axis rays at different heights are controlled within a range of ±0.05 mm. In FIGS. 27B and 27C that illustrate the two field curvature aberrations, astigmatic aberration in the sagittal direction falls within ±0.10 mm, and astigmatic aberration in the tangential direction falls within ±0.10 mm. In FIG. 27D, the diagram of distortion aberration shows that the distortion aberration of the sixth embodiment is maintained within a range of ±40%. Based on above, compared to the existing optical imaging lens, the sixth embodiment of the present disclosure still can provide good imaging quality under the condition of system length shortened to 4.197 mm.

Based on above, the advantage of the sixth embodiment compared to the first embodiment lies in: the system length of the sixth embodiment is smaller than the system length of the first embodiment. The HFOV of the sixth embodiment is greater than the HFOV of the first embodiment. The aberration in the tangential direction of the sixth embodiment is smaller than the aberration in the tangential direction of the first embodiment.

FIG. 30 is a schematic diagram illustrating an optical imaging lens according to a seventh embodiment of the disclosure, and FIGS. 31A to 32D are diagrams illustrating a longitudinal spherical aberration and various aberrations of the optical imaging lens according to the seventh embodiment. Referring first to FIG. 30, the optical imaging lens 10 according to the seventh embodiment of the disclosure is roughly similar to that of the first embodiment, but the two differ in the following: the optical data, the aspheric coefficients and the parameters of the lens elements 1, 2, 3, 4, 5 and 6 in the two embodiments are different to some extent. In addition, the fifth lens element 5 has positive refracting power. It should be noted that, for clear illustration, some of the reference numerals of the optical axis regions and the periphery regions having similar surface shapes with those of the first embodiment are omitted from FIG. 30.

The detailed optical data of the optical imaging lens 10 of the seventh embodiment is as shown in FIG. 32. Moreover, in the optical imaging lens 10 of the seventh embodiment, the EFL of the whole system is 1.671 mm, the HFOV is 55.363°, the Fno is 2.200, the system length is 4.182 mm, and the image height is 1.865 mm.

FIG. 33 shows the various aspheric coefficients of the object-side surface 15 of the first lens element 1 to the image-side surface 66 of the sixth lens element 6 in Formula (1) in the seventh embodiment.

In addition, relations of important parameters in the optical imaging lens 10 of the seventh embodiment are as shown in FIGS. 47 and 49.

In FIG. 31A that illustrates the longitudinal spherical aberration in the seventh embodiment, deviations of the imaging points of the off-axis rays at different heights are controlled within a range of ±0.035 mm. In FIGS. 31B and 31C that illustrate the two field curvature aberrations, astigmatic aberration in the sagittal direction falls within ±0.04 mm, and astigmatic aberration in the tangential direction falls within ±0.09 mm. In FIG. 31D, the diagram of distortion aberration shows that the distortion aberration of the seventh embodiment is maintained within a range of ±25%. Based on above, compared to the existing optical imaging lens, the seventh embodiment of the present disclosure still can provide good imaging quality under the condition of system length shortened to 4.182 mm.

Based on above, the advantage of the seventh embodiment compared to the first embodiment lies in: the system length of the seventh embodiment is smaller than the system length of the first embodiment. The longitudinal spherical aberration of the seventh embodiment is smaller than the longitudinal spherical aberration of the first embodiment. The aberration in the sagittal direction of the seventh embodiment is smaller than the aberration in the sagittal direction of the first embodiment. The aberration in the tangential direction of the seventh embodiment is smaller than the aberration in the tangential direction of the first embodiment. The distortion aberration of the seventh embodiment is smaller than the distortion aberration of the first embodiment.

FIG. 34 is a schematic diagram illustrating an optical imaging lens according to an eighth embodiment of the disclosure, and FIGS. 35A to 35D are diagrams illustrating a longitudinal spherical aberration and various aberrations of the optical imaging lens according to the eighth embodiment. Referring first to FIG. 34, the optical imaging lens 10 according to the eighth embodiment of the disclosure is roughly similar to that of the first embodiment, but the two differ in the following: the optical data, the aspheric coefficients and the parameters of the lens elements 1, 2, 3, 4, 5 and 6 in the two embodiments are different to some extent. In addition, in the present embodiment, the fourth lens element 4 has negative refracting power, and the optical axis region 461 of the image-side surface 46 of the fourth lens element 4 is concave. The fifth lens element 5 has positive refracting power. The sixth lens element 6 has positive refracting power. It should be noted that, for clear illustration, some of the reference numerals of the optical axis regions and the periphery regions having similar surface shapes with those of the first embodiment are omitted from FIG. 34.

The detailed optical data of the optical imaging lens 10 of the eighth embodiment is as shown in FIG. 36. Moreover, in the optical imaging lens 10 of the eighth embodiment, the EFL of the whole system is 1.744 mm, the HFOV is 55.369°, the Fno is 2.200, the system length is 3.703 mm, and the image height is 1.865 mm.

FIG. 37 shows the various aspheric coefficients of the object-side surface 15 of the first lens element 1 to the image-side surface 66 of the sixth lens element 6 in Formula (1) in the eighth embodiment.

In addition, relations of important parameters in the optical imaging lens 10 of the eighth embodiment are as shown in FIGS. 47 and 49.

In FIG. 35A that illustrates the longitudinal spherical aberration in the eighth embodiment, deviations of the imaging points of the off-axis rays at different heights are controlled within a range of ±0.035 mm. In FIGS. 35B and 35C that illustrate the two field curvature aberrations, astigmatic aberration in the sagittal direction falls within ±0.035 mm, and astigmatic aberration in the tangential direction falls within ±0.045 mm. In FIG. 35D, the diagram of distortion aberration shows that the distortion aberration of the eighth embodiment is maintained within a range of ±30%. Based on above, compared to the existing optical imaging lens, the eighth embodiment of the present disclosure still can provide good imaging quality under the condition of system length shortened to 3.703 mm.

Based on above, the advantage of the eighth embodiment compared to the first embodiment lies in: the system length of the eighth embodiment is smaller than the system length of the first embodiment. The HFOV of the eighth embodiment is greater than the HFOV of the first embodiment. The longitudinal spherical aberration of the eighth embodiment is smaller than the longitudinal spherical aberration of the first embodiment. The aberration in the sagittal direction of the eighth embodiment is smaller than the aberration in the sagittal direction of the first embodiment. The aberration in the tangential direction of the eighth embodiment is smaller than the aberration in the tangential direction of the first embodiment. The distortion aberration of the eighth embodiment is smaller than the distortion aberration of the first embodiment.

FIG. 38 is a schematic diagram illustrating an optical imaging lens according to a ninth embodiment of the disclosure, and FIGS. 39A to 39D are diagrams illustrating a longitudinal spherical aberration and various aberrations of the optical imaging lens according to the ninth embodiment. Referring first to FIG. 38, the optical imaging lens 10 according to the ninth embodiment of the disclosure is roughly similar to that of the first embodiment, but the two differ in the following: the optical data, the aspheric coefficients and the parameters of the lens elements 1, 2, 3, 4, 5 and 6 in the two embodiments are different to some extent. In addition, in the present embodiment, the third lens element 3 has positive refracting power. The periphery region 363 of three image-side surface 36 of the third lens element 3 is convex. It should be noted that, for clear illustration, some of the reference numerals of the optical axis regions and the periphery regions having similar surface shapes with those of the first embodiment are omitted from FIG. 38.

The detailed optical data of the optical imaging lens 10 of the ninth embodiment is as shown in FIG. 40. Moreover, in the optical imaging lens 10 of the ninth embodiment, the EFL of the whole system is 1.878 mm, the HFOV is 55.363°, the Fno is 2.200, the system length is 4.083 mm, and the image height is 1.865 mm.

FIG. 41 shows the various aspheric coefficients of the object-side surface 15 of the first lens element 1 to the image-side surface 66 of the sixth lens element 6 in Formula (1) in the ninth embodiment.

In addition, relations of important parameters in the optical imaging lens 10 of the ninth embodiment are as shown in FIGS. 47 and 49.

In FIG. 39A that illustrates the longitudinal spherical aberration in the ninth embodiment, deviations of the imaging points of the off-axis rays at different heights are controlled within a range of ±0.06 mm. In FIGS. 39B and 39C that illustrate the two field curvature aberrations, astigmatic aberration in the sagittal direction falls within ±0.07 mm, and astigmatic aberration in the tangential direction falls within ±0.07 mm. In FIG. 39D, the diagram of distortion aberration shows that the distortion aberration of the ninth embodiment is maintained within a range of ±35%. Based on above, compared to the existing optical imaging lens, the ninth embodiment of the present disclosure still can provide good imaging quality under the condition of system length shortened to 4.083 mm.

Based on above, the advantage of the ninth embodiment compared to the first embodiment lies in: the system length of the ninth embodiment is smaller than the system length of the first embodiment. The HFOV of the ninth embodiment is greater than the HFOV of the first embodiment. The aberration in the tangential direction of the ninth embodiment is smaller than the aberration in the tangential direction of the first embodiment. The distortion aberration of the ninth embodiment is smaller than the distortion aberration of the first embodiment.

FIG. 42 is a schematic diagram illustrating an optical imaging lens according to a tenth embodiment of the disclosure, and FIGS. 43A to 43D are diagrams illustrating a longitudinal spherical aberration and various aberrations of the optical imaging lens according to the tenth embodiment. Referring first to FIG. 42, the optical imaging lens 10 according to the tenth embodiment of the disclosure is roughly similar to that of the first embodiment, but the two differ in the following: the optical data, the aspheric coefficients and the parameters of the lens elements 1, 2, 3, 4, 5 and 6 in the two embodiments are different to some extent. It should be noted that, for clear illustration, some of the reference numerals of the optical axis regions and the periphery regions having similar surface shapes with those of the first embodiment are omitted from FIG. 42.

The detailed optical data of the optical imaging lens 10 of the tenth embodiment is as shown in FIG. 44. Moreover, in the optical imaging lens 10 of the tenth embodiment, the EFL of the whole system is 2.022 mm, the HFOV is 49.144°, the Fno is 2.200, the system length is 4.270 mm, and the image height is 1.810 mm.

FIG. 45 shows the various aspheric coefficients of the object-side surface 15 of the first lens element 1 to the image-side surface 66 of the sixth lens element 6 in Formula (1) in the tenth embodiment.

In addition, relations of important parameters in the optical imaging lens 10 of the tenth embodiment are as shown in FIGS. 47 and 49.

In FIG. 43A that illustrates the longitudinal spherical aberration in the tenth embodiment, deviations of the imaging points of the off-axis rays at different heights are controlled within a range of ±0.05 mm. In FIGS. 43B and 43C that illustrate the two field curvature aberrations, astigmatic aberration in the sagittal direction falls within ±0.05 mm, and astigmatic aberration in the tangential direction falls within ±0.10 mm. In FIG. 43D, the diagram of distortion aberration shows that the distortion aberration of the tenth embodiment is maintained within a range of ±25%. Based on above, compared to the existing optical imaging lens, the tenth embodiment of the present disclosure still can provide good imaging quality under the condition of system length shortened to 4.270 mm.

Based on above, the advantage of the tenth embodiment compared to the first embodiment lies in: the system length of the tenth embodiment is smaller than the system length of the first embodiment. The aberration in the sagittal direction of the tenth embodiment is smaller than the aberration in the sagittal direction of the first embodiment. The aberration in the tangential direction of the tenth embodiment is smaller than the aberration in the tangential direction of the first embodiment. The distortion aberration of the tenth embodiment is smaller than the distortion aberration of the first embodiment.

FIGS. 46, 47, 48, and 49 are tables listing the respective optical parameters of the first embodiment to the tenth embodiment. In order to reduce the length of the lens system, ensure the imaging quality, and in consideration of manufacturing difficulty at the same time, if the limitation of numerals as set forth in the conditions below is satisfied, a favorable configuration may be attained.

In the embodiments of the disclosure, the following condition is also met: TTL/(G23+T3+G34)≥9.000, preferably: 9.000≤TTL/(G23+T3+G34)≤12.700.

In the embodiments of the disclosure, the following condition is also met: $(T_{max}+T_{max2})/AAG \geq 1.800$, preferably: $1.800 \leq (T_{max}+T_{max2})/AAG \leq 2.500$.

In the embodiments of the disclosure, the following condition is also met: TL/EFL≤2.900, preferably: 1.400≤TL/EFL≤2.900.

In the embodiments of the disclosure, the following condition is also met: (T1+G12)/T6≤2.600, preferably: 1.800≤(T1+G12)/T6≤2.600.

In the embodiments of the disclosure, the following condition is also met: (G23+G34+T4)/T5≥2.400, preferably: 2.400≤(G23+G34+T4)/T5≤7.300.

In the embodiments of the disclosure, the following condition is also met: (T1+T2+T4)/BFL≤2.100, preferably: 1.100≤(T1+T2+T4)/BFL≤2.100.

In the embodiments of the disclosure, the following condition is also met: TTL/(T5+G56+T6)≥6.500, preferably: 6.500≤TTL/(T5+G56+T6)≤11.000.

In the embodiments of the disclosure, the following condition is also met: ALT/AAG≥2.700, preferably: 2.700≤ALT/AAG≤4.500.

In the embodiments of the disclosure, the following condition is also met: $TL/T_{max} \leq 4.300$, preferably: $2.700 \leq TL/T_{max} \leq 4.300$.

In the embodiments of the disclosure, the following condition is also met: (T1+G12+T2)/T3≥2.800, preferably: 2.800≤(T1+G12+T2)/T3≤6.400.

In the embodiments of the disclosure, the following condition is also met: (T5+T6)/T1≤2.500, preferably: 1.300≤(T5+T6)/T1≤2.500.

In the embodiments of the disclosure, the following condition is also met: EFL/BFL≥1.300, preferably: 1.300≤EFL/BFL≤2.600.

In the embodiments of the disclosure, the following condition is also met: TTL/AAG≥4.900, preferably: 4.900≤TTL/AAG≤7.100.

In the embodiments of the disclosure, the following condition is also met: TL/(G45+T5+G56)≥5.600, preferably: 5.600≤TL/(G45+T5+G56)≤16.600.

In the embodiments of the disclosure, the following condition is also met: (T2+T3+T4)/T1≥4.800, preferably: 4.800≤(T2+T3+T4)/T1≤10.200.

In the embodiments of the disclosure, the following condition is also met: ALT/(G12+G45)≥4.200, preferably: 4.200≤ALT/(G12+G45)≤5.700.

In the embodiments of the disclosure, the following condition is also met: $T_{max}/T_{max2} \geq 1.500$, preferably: $1.500 \leq T_{max}/T_{max2} \leq 2.800$.

In addition, it is optional to select a random combination relationship of the parameter in the embodiment to increase limitation of the lens for the ease of designing the lens having the same structure in the disclosure.

Due to the unpredictability in the design of an optical system, with the framework of the embodiments of the disclosure, under the circumstances where the above-described conditions are satisfied, the optical imaging system according to the embodiments of the disclosure has a reduced system length, a larger FOV, reduced Fno, or a higher yield with respect to the conventional art. Furthermore, the lens elements in the embodiments of the disclosure which are made of plastic material can lighten the weight of the optical imaging lens and save the cost.

In view of the foregoing, the optical imaging lens 10 according to the embodiments of the disclosure can provide the following effects and advantages:

1. The longitudinal spherical aberrations, the astigmatic aberrations, and the distortion aberrations provided in the embodiments of the disclosure all comply with usage specifications. Besides, the off-axis rays of the representative wavelengths, i.e., 486 nm, 586 nm, and 656 nm, at different heights are concentrated around the imaging point. The deviation range of each curve indicates that the deviations of the imaging points of the off-axis rays at different heights are controlled, and favorable spherical aberration, image aberration, and distortion suppressions are rendered. The imaging quality data further suggest that the distances among the three representative wavelengths, i.e., 486 nm, 586 nm, and 656 nm, are also very close to each other, suggesting that the embodiments of the disclosure are able to desirably concentrate rays of different wavelengths in various states and exhibit an excellent chromatic dispersion suppressing ability. Based on the above, the embodiments of the disclosure bring forth excellent imaging quality through the design and matching of the lens elements.

2. When the optical imaging lens 10 satisfies the following conditions:

a. The first lens element 1 has negative refracting power, and an optical axis region 151 of the object-side surface 15 of the first lens element 1 is convex.

b. A periphery region 253 of the object-side surface 25 of the second lens element 2 is convex, and an optical axis region 261 of the image-side surface 26 of the second lens element 2 is convex.

c. An optical axis region 351 of the object-side surface 35 of the third lens element 3 is convex.

d. An optical axis region 451 of the object-side surface 45 of the fourth lens element 4 is convex.

e. An optical axis region 561 of the image-side surface 56 of the fifth lens element 5 is convex.

f. A periphery region 663 of the image-side surface 66 of the sixth lens element 6 is convex.

g. Two of thicknesses of the first to the fourth lens elements 1 to 4 along the optical axis I are the thickest and the second thickest among the abovementioned six lens elements respectively, and by satisfying the condition on refracting power, design of surfaces shape and the thickness arrangement, the optical imaging lens may have large field of view, reduced lens length and maintain favorable imaging quality.

3. When the optical imaging lens 10 satisfies the following conditions:

a. The first lens has negative refracting power.

b. An optical axis region 251 of the object-side surface 25 of the second lens element 2 is convex, and a periphery region 263 of the image-side surface 26 of the second lens element 2 is convex.

c. An optical axis region 351 of the object-side surface 35 of the third lens element 3 is convex.

d. An optical axis region 451 of the object-side surface 45 of the fourth lens element 4 is convex, and a periphery region 463 of the image-side surface 46 of the fourth lens element 4 is convex.

e. An optical axis region 561 of the object-side surface 56 of the fifth lens element 5 is convex.

f. Two of thicknesses of the first to the fourth lens elements 1 to 4 along the optical axis I are the thickest and the second thickest among the abovementioned six lens elements respectively.

Furthermore, by satisfying the following one of the conditions g,h:

g. An optical axis region 151 of the object-side surface 15 of the first lens element 1 is convex.

h. A periphery region 153 of the object-side surface 15 of the first lens element 1 is convex.

By satisfying the condition on refracting power, design of the arrangement of surface shape and the thickness arrangement, the whole optical lens elements system not only may enlarge field of view, reduced imaging lens length and maintain favorable imaging quality, but also further correct aberration of the optical system and reduce distortion aberration.

4. When the optical imaging lens 10 satisfies the following conditions:

a. The first lens has negative refracting power.
b. The second lens has positive refracting power.
c. An optical axis region 351 of the object-side surface 35 of the third lens element 3 is convex, and a periphery region 363 of the image-side surface 36 of the third lens element 3 is concave.
d. An optical axis region 561 of the image-side surface 56 of the fifth lens element 5 is convex.
e. A periphery region 654 of the image-side surface 65 of the sixth lens element 6 is concave.
f. Two of thicknesses of the first to the fourth lens elements 1 to 4 along the optical axis I are the thickest and the second thickest among the abovementioned six lens elements respectively.
g. Satisfying the conditional expression: V4+V5≤80.000.

Furthermore, satisfying the following one of the conditional expressions: h,i,j.

h. A periphery region 153 of the object-side surface 15 of the first lens element 1 is convex.
i. An optical axis region 162 of the image-side surface 16 of the first lens element 1 is concave, and an optical axis region 664 of the image-side surface 66 of the sixth lens element 6 is concave.
j. A periphery region 563 of the image-side surface 56 of the fifth lens element 5 is convex, and an optical axis region 662 of the image-side surface 66 of the sixth lens element 6 is concave.

By satisfying the condition on refracting power, design of the surface shape of the lens elements and the thickness arrangement, the optical imaging lens may maintain favorable imaging quality, correct the aberration of the optical system, reduce the distortion aberration and improve chromatic aberration of the optical system, wherein a preferable scope of implementation of V4+V5 is 68.000≤V4+V5≤80.000.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element, a second lens element, a third lens element, a fourth lens element, a fifth lens element and a sixth lens element arranged in sequence from an object side to an image side along an optical axis, wherein each of the first lens element to the sixth lens element comprises an object-side surface facing the object side and allowing an imaging ray to pass through and an image-side surface facing the image side and allowing the imaging ray to pass through, the first lens element having negative refracting power, and an optical axis region of the object-side surface of the first lens element is convex;
a periphery region of the object-side surface of the second lens element is convex, and an optical axis region of the image-side surface of the second lens element is convex;
an optical axis region of the object-side surface of the third lens element is convex;
an optical axis region of the object-side surface of the fourth lens element is convex;
an optical axis region of the image-side surface of the fifth lens element is convex; and
a periphery region of the image-side surface of the sixth lens element is convex,
wherein the optical imaging lens only has the abovementioned six lenses,
wherein each of the first lens element to the sixth lens element has a thickness along the optical axis, two of thicknesses of the first to the fourth lens elements along the optical axis are the thickest and the second thickest among the abovementioned six lens elements respectively.

2. The optical imaging lens according to claim 1, wherein the optical imaging lens further satisfies: TTL/(G23+T3+G34)≥9.000, wherein TTL is a distance from the object-side surface of the first lens element to an image plane of the optical imaging lens along the optical axis, G23 is a distance between the image-side surface of the second lens element to the object-side surface of the third lens element along the optical axis, T3 is a thickness of the third lens element along the optical axis, and G34 is a distance from the image-side surface of the third lens element to the object-side surface of the fourth lens element along the optical axis.

3. The optical imaging lens according to claim 1, wherein the optical imaging lens further satisfies: $(T_{max}/T_{max2})/AAG \geq 1.800$, wherein $T_{max}$ is the thickest thickness of the first lens element to the sixth lens element along the optical axis, $T_{max2}$ is the second thickest thickness of the first lens element to the sixth lens element along the optical axis, and AAG is a sum of five air gaps of the first lens element to the sixth lens element along the optical axis.

4. The optical imaging lens according to claim 1, wherein the optical imaging lens further satisfies: TL/EFL≤2.900, wherein TL is a distance from the object-side surface of the first lens element to the image-side surface of the sixth lens element along the optical axis, and EFL is an effective focal length of the optical imaging lens.

5. The optical imaging lens according to claim 1, wherein the optical imaging lens further satisfies: (T1+G12)/T6≤2.600, wherein T1 is a thickness of the first lens element along the optical axis, G12 is a distance from the image-side surface of the first lens element to the object-side surface of the second lens element along the optical axis, and T6 is a thickness of the sixth lens element along the optical axis.

6. The optical imaging lens according to claim 1, wherein the optical imaging lens further satisfies: (G23+G34+T4)/T5≥2.400, wherein G23 is a distance between the image-side surface of the second lens element to the object-side surface of the third lens element along the optical axis, G34 is a distance from the image-side surface of the third lens element to the object-side surface of the fourth lens element along the optical axis, T4 is a thickness of the fourth lens element along the optical axis, and T5 is a thickness of the fifth lens element along the optical axis.

7. The optical imaging lens according to claim 1, wherein the optical imaging lens further satisfies: (T1+T2+T4)/BFL≤2.100, wherein T1 is a thickness of the first lens element along the optical axis, T2 is a thickness of the second lens element along the optical axis, T4 is a thickness of the fourth lens element along the optical axis, and BFL is a distance from the image-side surface of the sixth lens element to an image plane along the optical axis.

8. An optical imaging lens, comprising a first lens element, a second lens element, a third lens element, a fourth lens element, a fifth lens element and a sixth lens element arranged in sequence from an object side to an image side along an optical axis, wherein each of the first lens element to the sixth lens element comprises an object-side surface facing the object side and allowing an imaging ray to pass through and an image-side surface facing the image side and allowing the imaging ray to pass through,
the first lens element having negative refracting power, and an optical axis region of the object-side surface of the first lens element is convex;
an optical axis region of the object-side surface of the second lens element is convex, and a periphery region of the image-side surface of the second lens element is convex;
an optical axis region of the object-side surface of the third lens element is convex;
an optical axis region of the object-side surface of the fourth lens element is convex, and a periphery region of the image-side surface of the fourth lens element is convex; and
an optical axis region of the image-side surface of the fifth lens element is convex;
wherein the optical imaging lens only has the abovementioned six lenses,
wherein each of the first lens element to the sixth lens element has a thickness along the optical axis, and two of thicknesses of the first to the fourth lens elements along the optical axis are the thickest and the second thickest among the abovementioned six lens elements respectively.

9. The optical imaging lens according to claim 8, wherein the optical imaging lens further satisfies: TTL/(T5+G56+T6)≥6.500, wherein TTL is a distance from the object-side surface of the first lens element to an image plane of the optical imaging lens along the optical axis, T5 is a thickness of the fifth lens element along the optical axis, G56 is a distance from the image-side surface of the fifth lens element to the object-side surface of the sixth lens element along the optical axis, and T6 is a thickness of the sixth lens element along the optical axis.

10. The optical imaging lens according to claim 8, wherein the optical imaging lens further satisfies: ALT/AAG≥2.700, wherein ALT is a sum of thicknesses of the first lens element to the sixth lens element along the optical axis, and AAG is a sum of five air gaps of the first lens element to the sixth lens element along the optical axis.

11. The optical imaging lens according to claim 8, wherein the optical imaging lens further satisfies: TL/$T_{max}$≤4.300, wherein TL is a distance from the object-side surface of the first lens element to the image-side surface of the sixth lens element along the optical axis, and $T_{max}$ is the thickest thickness of the first lens element to the sixth lens element along the optical axis.

12. The optical imaging lens according to claim 8, wherein the optical imaging lens further satisfies:(T1+G12+T2)/T3≥2.800, wherein T1 is a thickness of the first lens element along the optical axis, G12 is a distance from the image-side surface of the first lens element to the object-side surface of the second lens element along the optical axis, T2 is a thickness of the second lens element along the optical axis, and T3 is a thickness of the third lens element along the optical axis.

13. The optical imaging lens according to claim 8, wherein the optical imaging lens further satisfies:(T5+T6)/T1≤2.500, wherein T5 is a thickness of the fifth lens element along the optical axis, T6 is a thickness of the sixth lens element along the optical axis, and T1 is a thickness of the first lens element along the optical axis.

14. The optical imaging lens according to claim 8, wherein the optical imaging lens further satisfies: EFL/BFL≥1.300, wherein EFL is an effective focal length of the optical imaging lens, and BFL is a distance from the image-side surface of the sixth lens element to an image plane along the optical axis.

15. An optical imaging lens, comprising a first lens element, a second lens element, a third lens element, a fourth lens element, a fifth lens element and a sixth lens element arranged in sequence from an object side to an image side along an optical axis, wherein each of the first lens element to the sixth lens element comprises an object-side surface facing the object side and allowing an imaging ray to pass through and an image-side surface facing the image side and allowing the imaging ray to pass through,
the first lens element having negative refracting power, and a periphery region of the object-side surface of the first lens element is convex;
an optical axis region of the object-side surface of the second lens element is convex, and a periphery region of the image-side surface of the second lens element is convex;
an optical axis region of the object-side surface of the third lens element is convex;
an optical axis region of the object-side surface of the fourth lens element is convex, and a periphery region of the image-side surface of the fourth lens element is convex; and
an optical axis region of the image-side surface of the fifth lens element is convex;
wherein the optical imaging lens only has the abovementioned six lenses,
wherein each of the first lens element to the sixth lens element has a thickness along the optical axis, two of thicknesses of the first to the fourth lens elements along the optical axis are the thickest and the second thickest among the abovementioned six lens elements respectively.

16. The optical imaging lens according to claim 15, wherein the optical imaging lens further satisfies: TTL/AAG≥4.900, wherein TTL is a distance from the object-side surface of the first lens element to an image plane of the optical imaging lens along the optical axis, and AAG is a sum of five air gaps of the first lens element to the sixth lens element along the optical axis.

17. The optical imaging lens according to claim 15, wherein the optical imaging lens further satisfies: TL/(G45+T5+G56)≥5.600, wherein TL is a distance from the object-side surface of the first lens element to the image-side surface of the sixth lens element along the optical axis, G45 is a distance from the image-side surface of the fourth lens element to the object-side surface of the fifth lens element along the optical axis, T5 is a thickness of the fifth lens element along the optical axis, and G56 is a distance from the image-side surface of the fifth lens element to the object-side surface of the sixth lens element along the optical axis.

18. The optical imaging lens according to claim 15, wherein the optical imaging lens further satisfies:$(T2+T3+T4)/T1 \geq 4.800$, wherein T2 is a thickness of the second lens element along the optical axis, T3 is a thickness of the third lens element along the optical axis, T4 is a thickness of the fourth lens element along the optical axis, and T1 is a thickness of the first lens element along the optical axis.

19. The optical imaging lens according to claim 15, wherein the optical imaging lens further satisfies: $ALT/(G12+G45) \geq 4.200$, wherein ALT is a sum of thicknesses of the first lens element to the sixth lens element along the optical axis, G12 is a distance from the image-side surface of the first lens element to the object-side surface of the second lens element along the optical axis, and G45 is a distance from the image-side surface of the fourth lens element to the object-side surface of the fifth lens element along the optical axis.

20. The optical imaging lens according to claim 15, wherein the optical imaging lens further satisfies: $T_{max}/T_{max2} \geq 1.500$, wherein $T_{max}$ is the thickest thickness of the first lens element to the sixth lens element along the optical axis, and $T_{max2}$ is the second thickest thickness of the first lens element to the sixth lens element along the optical axis.

\* \* \* \* \*